United States Patent [19]
Tamaki et al.

[11] Patent Number: 5,754,876
[45] Date of Patent: May 19, 1998

[54] DATA PROCESSOR SYSTEM FOR PRELOADING/POSTSTORING DATA ARRAYS PROCESSED BY PLURAL PROCESSORS IN A SHARING MANNER

[75] Inventors: Yoshiko Tamaki, Kodaira; Teruo Tanaka, Hadano; Tadayuki Sakakibaraa, Hadano, all of Japan

[73] Assignee: Hitachi, Ltd., Tokyo, Japan

[21] Appl. No.: 576,131

[22] Filed: Dec. 21, 1995

[30] Foreign Application Priority Data

Dec. 28, 1994 [JP] Japan .................. 6-327997

[51] Int. Cl.$^6$ .................................. G06F 13/38
[52] U.S. Cl. .................. 395/800.04; 395/800.02; 395/872
[58] Field of Search ................ 399/409, 441, 399/800, 841, 854, 852, 872, 844, 877, 800.02, 800.04; 711/31

[56] References Cited

U.S. PATENT DOCUMENTS

| | | | |
|---|---|---|---|
| 5,392,443 | 2/1995 | Sakakibara et al. | 395/800 |
| 5,437,043 | 7/1995 | Fujii et al. | 395/800 |
| 5,617,575 | 4/1997 | Sakakibara et al. | 395/800 |

FOREIGN PATENT DOCUMENTS

| | | |
|---|---|---|
| 3-266174 | 11/1991 | Japan . |
| 3-266174 | 6/1994 | Japan . |

OTHER PUBLICATIONS

Nakamura et al., "A 29-ns 64-Mb DRAM with Hierarchical Array Architecture", *Journal of Solid State Circuits*, IEEE, vol. 31, iss. 9, Sep. 1996, pp. 1302–1307.

Hiraki et al., "Overview of the JUMP-1, n MPP Prototype for General–Purpose Parallel Computations", *Parallel Architectures, Algorithms, and Networks, 1994 Symposium*, IEEE, Dec. 14–16, 1994, pp. 427–434.

Architecture and Evaluation of OCHANOMIZ-1, Information Processing Society Research Report, Computer Architecture 101–8, Aug. 20, 1993, pp. 57–64, Information Processing Society of Japan.

General purpose fine–grained parallel Processor: OCHA-NOMIZU-1—Architecture and Performance Evaluation, Proc. of Paralell Processing Symposium JSPP'94, pp. 73–80, Information Processing Society of Japan, May 1994.

*Primary Examiner*—William M. Treat
*Attorney, Agent, or Firm*—Antonelli, Terry, Stout, & Kraus, LLP

[57] ABSTRACT

Preload register groups are respectively provided for the plurality of scalar processors which execute iterative processing in distributed manner. Each group consists of preload registers corresponding to a plurality of data arrays that appear in the iterative processing. According to address information about the plurality of arrays to be preloaded specified by any of the processors, a preload control unit reads partial data groups of one of the arrays to be first processed by all of the processors from the main storage in parallel. Then, the same operation is performed on another array. Subsequently, in the above-mentioned manner, remaining elements of the arrays are read from one array to another. A partial element group thus read sequentially is stored in the plurality of preload register groups in distributed manner. According to a load request issued from each processor, the array elements preloaded in the preload register groups corresponding to that processor are read in the order the array elements were preloaded.

18 Claims, 17 Drawing Sheets

```
(1)  Set_prn   4
(2)  Set   LR,    N
(3)  Set   DR,    Cyclic
(4)  Set   BR0,   Base_of_A(I)
(5)  Set   BR1,   Base_of_B(I*2)
(6)  Set   BR2,   Base_of_C(I+1)
(7)  Set   BR3,   Base_of_D(I)
(8)  Set   SR0,   Stride_of_A(I)
(9)  Set   SR1,   Stride_of_B(I*2)
(10) Set   SR2,   Stride_of_C(I+1)
(11) Set   SR3,   Stride_of_D(I)
```

FIG. 3B

```
(1)  LD   GR0,  PR
(2)  LD   GR1,  PR
(3)  LD   GR2,  PR
(4)  M    GR3,  GR1,  GR2
(5)  A    GR4,  GR0,  GR3
(6)  LD   GR5,  PR
(7)  A    GR6,  GR4,  GR5
(8)  A    GR7,  GR7,  GR6
(9)  Loop until N / 4 times
```

FIG. 9A

| DATA DISTRIBUTION MODE | PRELOAD REQUESTER 0 | PRELOAD REQUESTER 1 | PRELOAD REQUESTER 2 | PRELOAD REQUESTER 3 |
|---|---|---|---|---|
| CYCLIC | BR | BR+SR | BR+SRx2 | BR+SRx3 |
| BLOCK | BR | BR+SRxLRx1/4 | BR+SRxLRx2/4 | BR+SRxLRx3/4 |

FIG. 9B

| DATA DISTRIBUTION MODE | PRELOAD REQUESTER 0 | PRELOAD REQUESTER 1 | PRELOAD REQUESTER 2 | PRELOAD REQUESTER 3 |
|---|---|---|---|---|
| CYCLIC | SRx4 | SRx4 | SRx4 | SRx4 |
| BLOCK | SR | SR | SR | SR |

FIG. 13A (1) Set_psrn    4
(2) Set  LR,    N
(3) Set  DR,    Cyclic
(4) Set  BR0,   Base_of_A(I)
(5) Set  BR1,   Base_of_B(I*2)
(6) Set  BR2,   Base_of_C(I+1)
(7) Set  BR3,   Base_of_D(I)
(8) Set  SR0,   Stride_of_A(I)
(9) Set  SR1,   Stride_of_B(I*2)
(10) Set SR2,   Stride_of_C(I+1)
(11) Set SR3,   Stride_of_D(I)

FIG. 13B (1) ST   GR0,   PSR
(2) ST   GR1,   PSR
(3) ST   GR2,   PSR
(4) ST   GR3,   PSR
(5) Loop until N / 4 times

| DATA DISTRIBUTION MODE | PRELOAD REQUESTER p | |
|---|---|---|
| | OUTPUT TO 505-n | OUTPUT 522-n |
| cyclic | BRi + SRixp + SRix4x64xk | SRix4 |
| block | BRi + SRixLR/4xp + SRix64xk | SRi | i = n / j     k = mod (n, j)

j = 32/prn : A TOTAL NUMBER OF COMBINED IPR'S

32 : A TOTAL NUMBER OF IPR'S prn : A TOTAL NUMBER OF USED IPR'S

DATA PROCESSOR SYSTEM FOR PRELOADING/POSTSTORING DATA ARRAYS PROCESSED BY PLURAL PROCESSORS IN A SHARING MANNER

BACKGROUND OF THE INVENTION

The present invention relates to a data processor system capable of prefetching/poststoring a plurality of data arrays to be processed by a plurality of processors for performing iterative processing in a shared manner from or into a main storage shared thereby and, more particularly, to a data processor system capable of performing prefetching/poststoring operations by processing, in a shared manner, each iterative operation of iterative processing such as a DO loop of FORTRAN to provide a high efficiency in performing so-called micro-tasking.

Conventionally, many processors try to mitigate main storage latency by the cache. However, in scientific computations, in which large-scale data are handled mostly, there is only a small degree of locality in data reference, causing the cache to not work effectively. To solve this problem, prefetching and preloading mechanisms have been proposed. In these mechanisms, array data is read from the main storage before the array data is used by the processor and the read array data is held in the buffer for preloading to be read out of the buffer by the processor when the processor processes any of the elements of the array data. Such a setup makes transparent to the processor the time in which the processor reads the array data from the main storage as described in document 1 "Architecture And Evaluation of OCHANOMIZ-1," the Information Processing Society Research Report, Computer Architecture 101-8, Aug. 20, 1993, pp. 57–64, Information Processing Society of Japan or documents "General Purpose Fine-Grained Parallel Processor: OCHANOMIZU; Architecture and Performance Evaluator" Proc. of Parallel Processing Symposium JSPP '94, Pp. 73–80, Information Processing Society of Japan, May 1994, for example. This document discloses a system having a plurality of processors in which each of the processors prefetches array data on its own. To be more specific, a plurality of external agents are connected to the main storage via a common bus and each processor accesses the main storage via one of the agents and the common bus. According to the address, stride, and length of array data to be prefetched, the array data being indicated by each processor, one of the external agents prefetches a plurality of pieces of data, stores the prefetched data in the local buffer memory provided in the external agent, and, when a processor issues an access request, supplies the prefetched data from the local buffer to that processor.

Document 2 "A Data Processing Apparatus: Japanese Patent Laid-Open No. 3-266174" discloses preloading or postloading in a multi-vector-processor system. Generally, in high-speed computing systems, the main storage consists of a plurality of banks which allows high-speed access to contiguous address storage locations in the main storage. In micro-tasking, however, each processor often asynchronously accesses one piece of array data by dividing it in a skipped manner. Such access is inconvenient for the multi-bank main storage that processes continuous access efficiently. In the method disclosed in the document 2, the preloading or poststoring is performed which is suitable for rapidly reading vector data from the main storage or rapidly writing the vector data to the main storage, the vector data being processed by the plurality of vector processors in a distributed manner, the multi-bank main storage being shared by the plurality of vector processors.

Namely, a preload buffer or a poststore buffer is provided for each of the plurality of vector processors. A buffer control unit commonly provided for the plurality of vector processors preloads the vector data to be divided by these vector processors for processing. In this case, based on the main storage address, stride, and length information, a plurality of elements of the vector data are collectively preloaded. According to a data distribution range of an array of each vector processor, the plurality of preloaded elements are stored in a plurality of buffers respectively provided for the plurality of vector processors in a distributed manner. Each vector processor references the corresponding buffer independently and asynchronously. In poststoring, when vector elements written by each vector processor in the corresponding buffer have been accumulated to a certain amount, the buffer control unit stores all the vector elements written by all the vector processors in the main storage.

Generally, in a multi-vector-processor system, each of the vector processors processes all elements of one piece of vector data continuously. Therefore, as described in the document 2, all elements of one piece of vector data are stored in one buffer before being processed. However, when so-called micro-tasking is performed in which a plurality of scalar processors perform in a distributed manner, each iteration of iterative processing such as a DO loop of FORTRAN, the loop iterative processing includes a plurality of arrays and these scalar processors sequentially access different arrays for each loop iteration. Hence, an index element of any of arrays A, B, C, D, and E for example is used and then data of a next index is used. The above-mentioned documents 1 and 2 disclose the estimated performance obtained by applying the disclosed technique to a program for processing a plurality of arrays. However, the documents do not disclose a method of prefetching the plurality of arrays. In the disclosed technique, the plurality of external agents prefetch data from the main storage via the bus common to these external agents, so that the main memory access operations by these external agents must be performed sequentially.

SUMMARY OF THE INVENTION

It is therefore an object of the present invention to provide a data processor system having a preload circuit and a poststore circuit suitable for performing the loop iterative processing for rapidly processing a plurality of arrays by dividing the loop iterative processing by a plurality of scalar processors.

In carrying out the invention and according to a first aspect thereof, there is provided a circuit having:

a plurality of buffers provided for each one of processors sharing a main storage; and a preload circuit in which a plurality of data groups are preloaded and are divided into partial data groups, the plurality of data groups are read from the main storage such that partial data groups of different data groups are sequentially read, a plurality of pieces of data of each partial data group are read from the main storage in parallel, and the partial data groups that have been read are written to the plurality of buffers in a distributed manner.

According to the first aspect of the invention, if the invention is applied, for example, to a data processor system having four processors wherein four arrays A, B, C, and D are processed in loop iterative processing, a partial data group consisting of partial elements A(1), A(2), A(3), and A(4) of array data A are first read in parallel from the main storage and the partial elements are written to four buffers respectively. Then, a partial data group consisting of partial elements B(1), B(2), B(3), and B(4) of array data B are read in parallel from the main storage and the partial elements are written to the four buffers respectively. The same holds true with the rest of the arrays. Consequently, whenever a partial data group of any array has been preloaded, the preloaded data can be submitted to the processing by each processor. This allows each processor to start using the already preloaded partial data groups before all data of the plural data groups are preloaded. In addition, because partial data groups of one array are read from the main storage in parallel, if the partial data groups are located at continuous addresses in the main storage, the partial data groups can be read faster when the main storage is composed of a plurality of banks.

Further, because the elements of the plurality of arrays are held in the buffers for the processors in a mixed manner, each processor may only have one buffer, simplifying the constitution of the preload circuit.

In a first preferred mode of the first aspect of the invention, a storage area in the buffer for each processor is composed of a plurality of areas, the storage area being grouped for use according to the total number of arrays to be used in loop processing by the corresponding buffer. If the total number of arrays varies, the number of storage areas corresponding to the variation is available for each array.

In a second preferred mode of the first aspect of the invention, data to be processed by each processor are preloaded, in multiple pieces, from the main storage in parallel to be written to the buffer for that processor in parallel. This shortens the time in which the data are preloaded from the main storage.

In a third preferred mode of the first aspect of the invention, there is provided a data processor system having:
- a circuit for detecting, from data written to each of a plurality of butters, the number of pieces of unread data not yet transferred to a processor corresponding to that buffer in order to detect a minimum value of the number of unread data detected for each of the plurality of buffers;
- a circuit for inhibiting the main storage read circuit from reading a partial data group subsequent to the plurality of data groups when the detected minimum value is zero after writing the number of pieces of data that can be held in each buffer to each buffer; and
- a circuit for writing, after writing the number of pieces of data that can be held in each buffer to that buffer, the subsequent partial data group read from the main storage to a storage location in each buffer at which read data already transferred to the processor corresponding to that buffer is held.

The above-mentioned setup allows array elements of which amount exceeds the storage capacity of the plurality of buffers to be preloaded from the main storage in parallel. Consequently, each of the buffers may have a storage capacity smaller than the total amount of data to be processed in loop processing.

In a second aspect of the invention, each of the plurality of processors is constituted such that, a plurality of data groups generated in processing performed by the plurality of processors in a shared manner, a plurality of pieces of data to be supplied by that processor are supplied sequentially in the order of different data groups to which the pieces of data belong;
- a circuit for poststoring the plurality of data groups in the main storage comprises;
- a plurality of buffers each provided for each of the plurality of processors, and
- a circuit for dividing the plurality of data groups held in the plurality of buffers into partial data groups belonging to the same data group, reading the partial data groups from the corresponding storage location group in the buffers, and writing the read partial data groups to the main storage as the partial data groups belonging to the same data group.

According to the second aspect of the invention, the plurality of data groups to be poststored are read from the plurality of buffers in units of partial data groups to be written to the main storage in parallel as with the first aspect of the invention, allowing the data to be written to the main storage before all data of the plurality of data groups are written to the plurality of buffers. In addition, because a plurality of elements belonging to the same array data are written to the main storage in parallel, when the partial data groups are written at continuous addresses in the main storage, the writing speed can be increased for the same reason as with the first aspect of the invention.

In a third aspect of the invention, the above-mentioned third mode of the first aspect of the invention is applied to the case in which a plurality of pieces of data belonging to at least one array are preloaded into buffers of different processors by loop processing.

BRIEF DESCRIPTION OF THE DRAWINGS

The above and other objects, features and advantages of the present invention will become more apparent from the accompanying drawings, in which like reference numerals are used to identify the same or similar parts in several views.

FIG. 2 is an example of a FORTRAN program for executing the processing to be performed by the data processing system of FIG. 1;

FIG. 3A shows an example of a machine-language instruction string for setting-up, for execution of the program of FIG. 2 by each of the processors constituting the system of FIG. 1;

FIG. 3B shows an example of a machine-language instruction string for loop processing, for execution of the program of FIG. 2 by each of the processors constituting the system of FIG. 1;

FIG. 9A is a table listing values of address-associated information to be set by an initializing circuit as used in the unit of FIG. 5;

FIG. 9B is a table listing other values of address-associated information to be set by an initializing circuit as used in the unit of FIG. 5;

FIG. 12 shows an example of a FORTRAN program for executing processing to be performed by the system of FIG. 11;

FIG. 13A shows an example of a machine-language instruction string for setting-up, for execution of the FORTRAN program of FIG. 12;

FIG. 13B shows an example of a machine-language instruction string for loop processing, for execution of the FORTRAN program of FIG. 12;

DETAILED DESCRIPTION OF PREFERRED EMBODIMENTS

Figure 1:
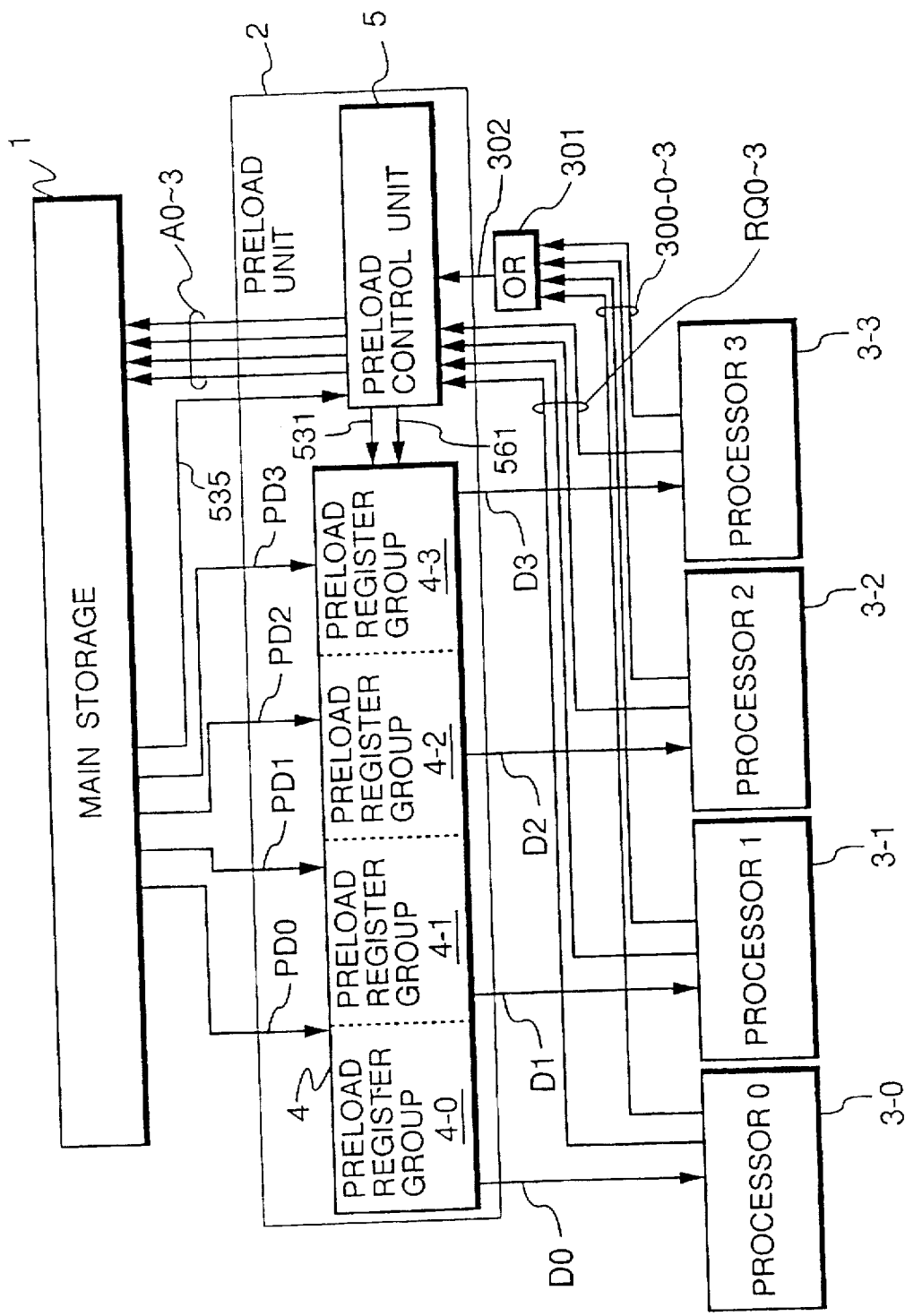
FIG. 1 is an overall block diagram illustrating a preloadable data processor system capable of preloading an array of data, practiced as a first preferred embodiment of the invention.

This invention will be described in further detail by way of example with reference to the accompanying drawings. It should be noted that, throughout the drawings and the related descriptions that follow, similar reference numerals refer to similar elements or members. Also, reference numerals followed by other numerals with a dash in between, for example, 3-0 through 3-3 may be collectively represented as 3-0~3. However, reference numerals 3-0~3 for example may designate all or only one of 3-0, 3-1, 3-2, and 3-3. The same holds true with other reference numerals.
<Embodiment 1>
(1) Overview of the system Now, referring to FIG. 1, reference numeral 1 indicates a main storage having multi-bank constitution while reference numerals 3-0~3 indicate processors that share the main storage 1 to execute a DO loop of FORTRAN illustratively shown in FIG. 2. Reference numeral 2 indicates a preload unit arranged between the main storage 1 and the processors 3-0~3 to execute preloading. The preload unit 2 has a preload control unit 5 for controlling a preload operation and preload register groups 4 that are used as preload buffers for holding preloaded data. The preload register groups 4 consists of preload register groups 4-0~3 corresponding to the processors 3-0~3 respectively.

Each of the preload register groups 4-0~3 has 32 preload registers. Only four preload registers are illustrated, as shown in FIG. 4, for simplicity because a program to be executed by the processors specifies only four preload registers in the first preferred embodiment as will be described.

Figure 4:
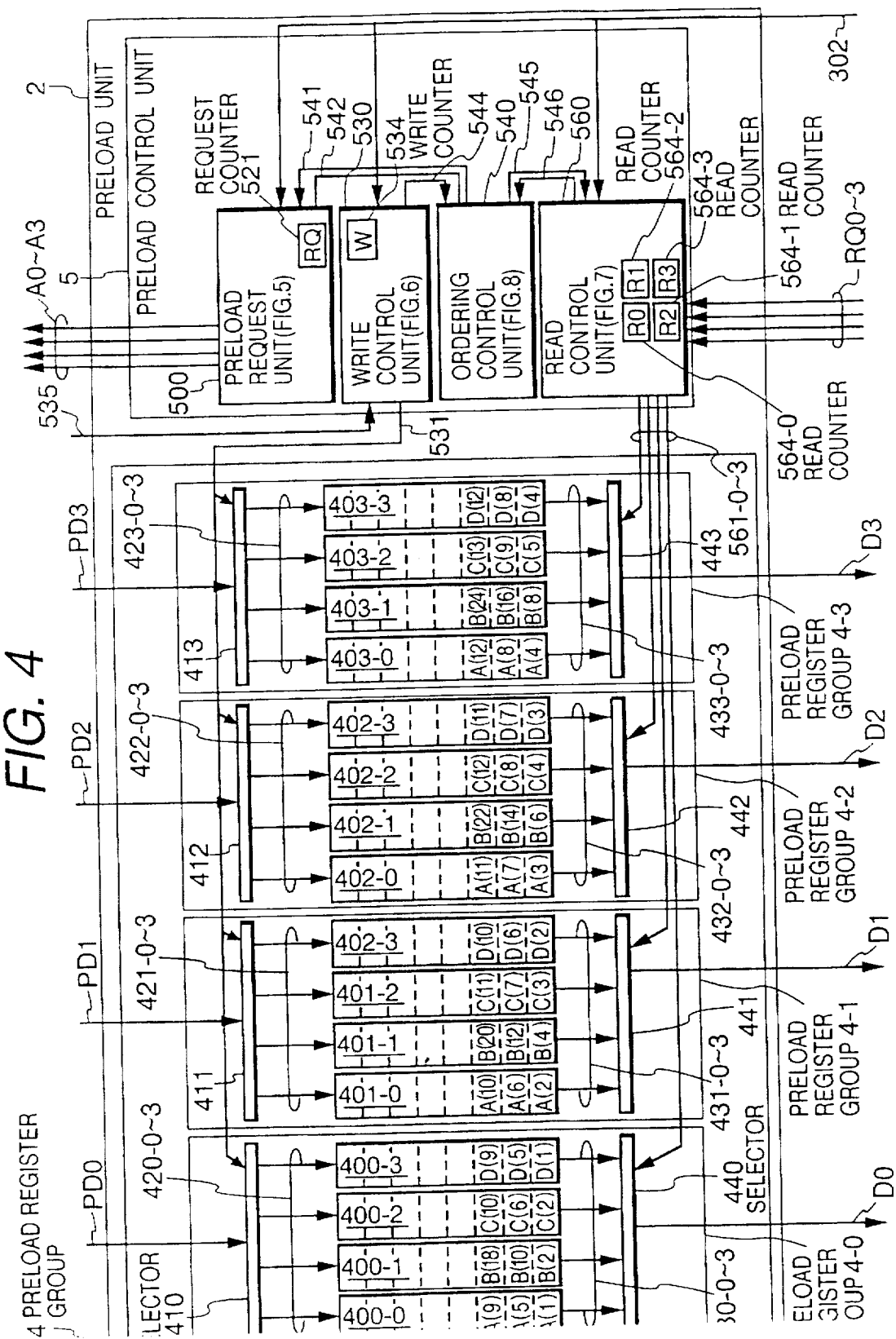
FIG. 4 is a block diagram illustrating preload register groups and a preload control unit as used in the system of FIG. 1.

Referring to FIG. 4, each of the preload register groups 4-0~3 has four preload registers 400-0~3, 401-0~3, 402-0~3 or 403-0~3, a selector 410, 411, 412 or 413 for selecting a preload register to which data preloaded from the main storage 1 is written, and a selector 440, 441, 442 or 443 for selecting from each preload register group a preload register from which preload data is read.

The four preload registers in each preload register group are assigned with register numbers determined for that group. In what follows, the preload registers 400-0, 400-1, 400-2, and 400-3 in the preload register group 4-0 are called preload registers PR0, PR1, PR2, and PR3 respectively. The same holds true with the four preload registers of each of the other preload register groups 4-1~3.

The preload control unit 5 contains a preload request unit 500, a write control unit 530, an ordering control unit 540, and a read control unit 560.

Figure 5:
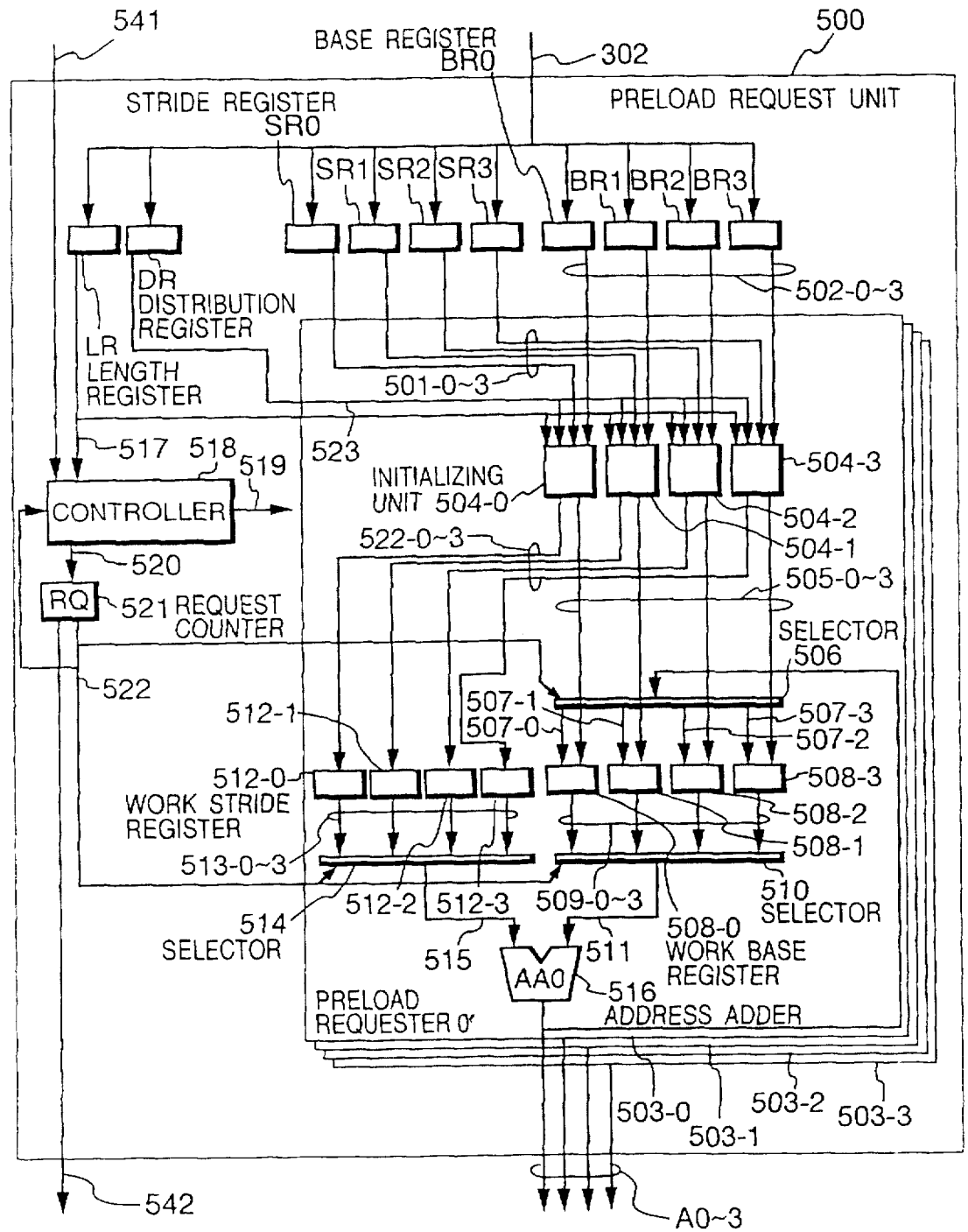
FIG. 5 is a block diagram illustrating a preload request unit as used in the system of FIG. 1.

Referring to FIG. 5, the preload request unit 500 contains four preload requesters 503-0—3 corresponding to the processors 3-0~3 respectively. In what follows, these requesters may be called preload requesters 0~3. These preload requesters also correspond to the preload register groups 4-0, 4-1, 4-2, and 4-3 to read four pieces of data from the main storage 1 in parallel to be stored in corresponding preload registers.

A length register LR, a distribution register DR, four base registers BR0~3, and four stride registers SR0~3 provide a register group for holding preload information for specifying array data to be preloaded that is supplied from one of the four processors 3-0~3. According to the preload information held in these registers, the above-mentioned preload requesters 503-0~3 sequentially generate address data for a plurality of pieces of data belonging to a plurality of pieces of array data. In the first embodiment, an array data read sequence is predetermined such that array data specified by a combination of registers SR1 and BR1 is read i-th time.

In the first embodiment, these preload requesters 503-0~3 are characterized by the fact that the requesters divides the same array data into four pieces of data and reads these four pieces of data sequentially from the main storage 1; upon reading the four pieces of data of any array data, the requesters read four pieces of data of next array data, and so on.

Referring to FIG. 4, every time four pieces of data are read by the above-mentioned preload requesters 503-0~3, the write control unit 530 stores the read four pieces of data in preload registers in a distributed manner, these preload registers having the same register numbers throughout the four preload register groups 4-0~4-3. Further, when subsequent four pieces of data have been read from the main storage by the preload requesters, the write control unit stores the subsequently read four pieces of data in preload registers in a distributed manner, these preload registers having the same next register number throughout the four preload register groups 4-0~4-3.

Thus, in the first embodiment, each preload register group holds data belonging to sequentially different array data in preload registers having sequentially different register numbers and each preload register within each preload register group holds a plurality of pieces of data belonging to one of the sequentially different array data.

Referring to FIG. 4, in response to a plurality of load requests issued from processors, the read control unit 560 reads the plurality of pieces of data preloaded in the preload register groups corresponding to the processors in the order in which the plurality pieces of data have been preloaded and supplies the read data to the processors. Consequently, in the first embodiment, the read control unit 560 is constituted such that the data are sequentially read from the sequentially numbered preload registers.

Referring to FIG. 4 again, the ordering control unit 540 controls the read control unit 560 such that the writing of data to a preload register is not overtaken by its reading by a load request. The ordering control unit also controls the preload request unit 500 such that a location at which unread preload data is stored is not written over by another piece of preload data.

In what follows, the details of the first embodiment will be described.

(2) Setting up preload information

In the case of the DO loop of FIG. 2, each of the processors processes different elements from the four arrays A through D in a sharing manner. For a data distribution mode for indicating which element of each array is to be assigned to each processor, one of a plurality of known data distribution modes such as cyclic distribution and block distribution is used. The following description is made about the case with cyclic distribution specified. It should be noted that operations to be performed when block distribution will also be described as appropriate. In the program of FIG. 2, if cyclic distribution is specified, the processor 3-0 bears indexes I=1, 5, 9, . . . , the processor 3-1 bears indexes I=2, 6, 10, . . . , the processor 3-2 bears indexes I=3, 7, 11, . . . , and the processor 3-3 bears indexes I=4, 8, 12, . . . .

Each processor sets up preload information to the preload control unit 5 via signal lines 300-0~3, an OR circuit 301, and a signal line 302 of FIG. 1, the preload information containing the start addresses and strides of all arrays A, B, C, and D in the DO loop, a loop length N, and the data distribution mode specified for that processor.

FIGS. 3A and 3B show an image of the machine-language instruction strings for executing the DO loop of FIG. 2.

FIG. 3A shows the machine-language instruction string for setting up the preload information for executing this DO loop processing in the present embodiment to the preload unit 2. In this machine-language instruction string, each of the instructions specifies registers to be set up. The instruction (1) notifies the preload control unit 5 of the number of preload registers to be used. The instructions (2) and (3) set a total loop length obtained by summing the accesses of all processors to the length register LR and the processor data distribution mode to the distribution register DR, respectively, both registers being arranged in the preload control unit 2. Further, the instructions (4) through (11) set the start addresses of arrays A, B, C, and D to the base registers BR0~3 and the access strides to the arrays A, B, C, and D obtained by summing the accesses of all processors to the stride registers SR0~3. By this instruction string, the address of the array element A(1) is set to the base register BR0, the address of the array element B(2) to the base register BR1, the address of array element C(2) to the base register BR2, and the address of the array element D(1) to the base register BR3. If each element of the arrays A, B, C, and D is eight bytes wide, a stride of eight bytes is set to stride register SR0, a stride of 16 bytes to the stride register SR1, a stride of eight bytes to the stride register SR2, and a stride of eight bytes is set to the stride register SR3.

As will be described later, in the first embodiment, the order in which the arrays are preloaded is predetermined such that the data belonging to the array data specified by a combination of stride register SRi (i=, 1, 2 or 3) and base register BRi is read the i-th time. Therefore, in this example, the above-mentioned program has made a request that the partial data groups belonging to the arrays A, B, C, and D be preloaded from the main storage in the order of A, B, C, and D.

(3) Address calculation and preloading

When the above-mentioned setup operation has been completed, the preload unit 2 automatically begins preloading of the arrays A, B, C, and D. In this case, in the manner to be described, array element A(I) is preloaded in the preload register PR0 in the preload register groups 4-0~3, array element B(I×2) in the preload register PR1, array element C(I+1) in the preload register PR2, and array element D(I) into the preload register PR3 according to cyclic distribution. For example, as for the preload register PR0, array element A(I)[I=1, 5, 9, . . . ] is preloaded in the preload register PR0 of the preload register group 4-0, array element A(I)[I=2, 6, 10, . . . ] is preloaded in the preload register PR0 of the preload register group 4-1, array element A(I)[I=3, 7, 11 . . . . ] is preloaded in the preload register PR0 of the preload register group 4-2, and array element A(I)[I= 4, 8, 12, . . . ] is preloaded in the preload register PR0 of the preload register group 4-3.

Now, when the preload information sent from any of the processors 3-0~3 has been set to the registers LR, DR, SR0~3, and BR0~3, the preload request unit 500 generates addresses A0~3 based on the preload information to send the generated addresses collectively to the main storage 1, making a request for preloading. The preload information is captured in the preload requesters 503-0~3 to be used for address calculation for each processor.

That is, when the information has been set to the registers LR, DR, SR0-3, and BR0-3, the preload request unit 500 sends to the main storage 1 a preload request including the addresses A0~3 every cycle unless an inhibit signal 541 comes or the processing for the loop length has been completed.

A preload control circuit 518 is used to control the sending of preload requests. A request counter (RQ) 521 counts the total number of preload requests issued from the preload unit 2. A preload controller 518 sends a preload activation signal 519 to the preload requesters 503-0~3 unless the request issue inhibit signal comes from the signal line 541 and the number of transmitted preload requests indicated by the request counter 521 exceeds a value of the length register LR obtained via a signal line 517 times the total number of arrays (four in the present example) divided by the number of processors (four in the present example). At the same time, the controller activates the request counter (RQ) 521 via a line 520. The value of this request counter is used to instruct the generation of addresses of the arrays in the preload requesters 503-0~3. Further, via a signal line 542, information about whether the request counter 521 has been counted in each cycle is sent to the ordering control unit 540.

The preload requesters 503-0~3 generate the addresses A0~3 only for a cycle in which the value of the preload activation signal 519 is valid. The address calculation is performed as follows. Because the operations of the preload requesters 503-0~3 are substantially similar, the following description uses the preload requester 503-0 by way of example.

The preload requester 503-0 has work base registers 508-0~3, work stride registers 512-0~3, and an address adder 516. Using these component circuits, an address of data to be preloaded in the preload register group 4-0 is calculated every cycle.

Namely, the work base register 508-0 and the work stride register 512-0 are used to calculate the addresses of elements of index I=1, 5, 9, . . . of an array specified by the preload information held in a pair of stride register SR0 and base register BR0, in this case, array A(I).

Likewise, the work base register 508-1 and the work stride register 512-1 are used to calculate the addresses of elements of index of an array specified by the preload information held in a pair of stride register SR1 and base register BR1, in this case, array B(I). The work base register 508-2 and work stride register 512-2 are used to calculate the addresses of elements of index of an array specified by the preload information held in a pair of stride register SR2 and a base register BR2, in this case, array C(I). The work base register 508-3 and work stride register 512-3 are used to calculate the addresses of elements of index of an array specified by the preload information held in a pair of stride register SR3 and base register BR3, in this case, array D(I).

The preload requester 503-0 further contains initializing units 504-0~3 for initializing the work base registers 508-0~3 and the word stride registers 512-0~3 so that the address of array elements corresponding to the processor 3-0 can be calculated.

To be specific, the initializing units receive values of the length register LR, distribution register DR, stride registers SR0~3, and base registers BR0~3 via the signal lines 517, 523, 501-0~3, and 502-0~3. Then, according to the value of the distribution register DR, namely the specified data distribution mode, the initializing units calculate the addresses of the array elements that each processor accesses for the first time and set the calculated addresses to the work base registers 508-0~3 via signal lines 505-0~3. Also, The initializing units 504-0~3 calculate the access stride of each processor according to the specified data distribution mode to set the calculated access stride to the work stride registers 512-0~3 via signal lines 522-0~3.

The values to be output on the signal lines 505-0~3 and 522-0~3 are calculated as shown in FIGS. 9A and 9B when the specified data distribution mode is of the cyclic type and block type respectively. The values listed in FIGS. 9A and 9B will be described briefly as follows. In the case of cyclic distribution, every time a loop index changes, the corresponding array element is processed in different processors, so that the addresses of arrays that the four processors process for the first time are addresses shifted from the value (hereinafter referred to as BR for simplicity) indicated by the base register BR (index i omitted hereinafter) by the value (hereinafter referred to as SR for simplicity) indicated by the stride register SR (index i omitted hereinafter for simplicity); namely, BR, BR+SR, BR+SR×2, and BR+SR×3. The access stride of each processor is SR ×4 because the number of processors is four. In the case of block distribution, each processor processes the array elements obtained by dividing the total loop length indicated by the length register LR by the number of processors, namely, four, so that the addresses of arrays to be first processed by the four processors become the addresses shifted from the value BR indicated by the base register BR by the value indicated by SR×LR/4; namely, BR, BR+SR×LR/4, BR+SR×LR/4×2, BR +SR×LR/4×3. The access stride of each processor becomes the original stride SR.

When the initialization has been completed, the address adder 516 adds the address in the work base register obtained via a selector 510 and a signal line 511 to the stride in the work stride register obtained via a selector 514 and a signal line 515, every time a preload activation signal comes from the preload controller 518 via the signal line 519. The result is sent to the main storage as a preload request address A0. The selectors 510 and 514, controlled by the value of the request counter 521 via the signal line 522 such that work base registers and work stride registers for sequentially different arrays, are selected. A method of this control will be described later. The above-mentioned result of the addition is also written one of the work base registers 508-0~3 used for the address calculation, via a selector 506 and one of the signal lines 507-0~3 selected by the selector 506. The selector 506 is also controlled based on the total number of preload requests given from the request counter 521 via the signal line 522.

The selectors 510, 514, and 506 must be controlled by the request counter 521 in the following manner. Namely, if the work base register 508-0 and the work stride register 512-0 corresponding to the array A elements have been selected in the preceding cycle, the work base register 508-1 and the work stride register 512-1 corresponding to the array B elements are selected when the request counter 521 increments by one. In the same way, the work base registers and the work stride registers corresponding to the arrays C and D are selected sequentially. If the request counter 521 increments by one with the work base register 508-3 and the work stride register 512-3 corresponding to the array D elements selected in the preceding cycle, the work base register 508-0 and the work stride register 512-0 corresponding to the array A elements are selected.

This selection is performed by specifying the work base registers and the work stride registers with a lower-order bit pattern of the request counter 521. In this example, when the lower-order bit pattern is '00', the work base register 508-0 and the work stride register 512-0 are specified; when the pattern is '01', the work base register 508-1 and the work stride register 512-1 are selected; when the pattern is '10', the work base register 508-2 and the work stride register 512-2 are selected; and when the pattern is '11', the work base register 508-3 and the work stride register 512-3 are specified.

Thus, the preload requester 503-0 generates addresses for preloading data to be used by the processor 3-0 in the order of the arrays A, B, C, and D. The same holds true with the other preload requesters 503-1~3.

As seen from the above description, a pair of the work base register 508-i (i=0, 1, 2 or 3) and the work stride register 512-i is combined with the address adder 516 and the selectors 510, 514, and 507 to form an address generator for sequentially generating addresses of a plurality of pieces of data belonging to the i-th array of the arrays A, B, C, and D and to be used by the processor 3-0. Thus, in the first embodiment, the array elements A(1), B(2), C(2), D(1), A(2), B(3), C(3), D(2) and so on are sequentially preloaded by the preload requester 503-0 from the main storage 1 in the order of these data. The same holds true with the other preload requesters.

The preload requesters 503-0~3 operate in synchronization with the preload activation signal coming from the signal line 519. Consequently, the first partial data group of the array data A consisting of partial data groups A(1), A(2), A(3), and A(4) are preloaded by the preload requesters 503-0~3 from the main storage 1 in parallel, followed by the first partial data group of the array data B consisting of partial data groups B(2), B(4), B(6), and B(8), followed by the first partial data group of the array data C consisting of partial data groups C(2), C(4), C(6), and C(8), followed by the first partial data group of the array data D consisting of partial data groups D(1), D(2), D(3), and D(4), and then followed by the second partial data group of the array data A consisting of partial data groups A(5), A(6), A(7), and A(8). The other data of these arrays are also read in the same manner.

Thus, the preload request unit 500 can issue preload requests to the main storage 1 for all of the identical indexes of all arrays unless the inhibit signal 541 comes. Further, in the case of cyclic distribution, addresses A0~3 are often continuous, so that continuous access requests can be issued collectively to the main storage 1.

(4) Writing preload data to the preload registers From the main storage 1, the data located at the supplied addresses A0~3 are collectively read to be output onto signal lines PD0~3; at the same, a valid signal for indicating that the values of the signal lines PD0~3 are valid is output from the main storage 1 to a signal line 535. The main storage 1 transfers the above-mentioned data and valid signal to the preload register groups 4 via the signal lines PD0~3 and the signal line 535 in the order in which the reload requests including the address A0~3 have been made. This can be implemented, for example, by a known technique in which a buffer is provided in the main storage 1 to hold the sequence in which the preload requests were received and the preload requests are sorted in the buffer.

Receiving the valid signal 535, the write control unit 530 writes the data PD0~3 to the preload register groups 4. All data read from the main storage 1 are simultaneously written to the four preload registers having the same register number among the preload registers 400-0~3, 401-0~3, 402-0~3, and 403-0~3 via the signal lines 420-0~3, 421-0~3, 422-0~3, and 423-0~3 selected by the selectors 410, 411, 412, and 413, respectively.

Figure 6:
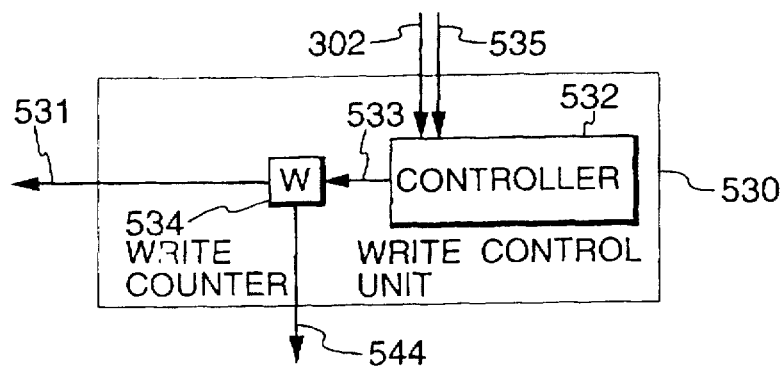
FIG. 6 is a block diagram illustrating a write control unit for the preload registers, as used in the system of FIG. 1.

Referring to FIG. 6, there is shown a block diagram of the write control unit 530. The write control unit 530 receives the valid signal 535 sent from the main storage 1 in synchronization with the data read from the main storage 1 to generate a control signal 531 that controls the selectors 410, 411, 412, and 413 such that the read data are written to the appropriate locations in the preload register groups 4. To be more specific, the controller 532 receives information via the signal line 302 indicating the number of preload registers used and predetermines the counting method (to be described) of a write counter 534. Then, the controller 532 increments the write counter 534 via a signal line 533 every time the valid signal 535 comes, the count value being output onto the signal line 531.

Specification of the write positions in the preload register groups 4-0~3 by the signal line 531 must be made as follows. Namely, when the write counter 534 increments by one upon writing to a position of an element of the array A in the preceding cycle, data is written to the same element position of the array B. When the write counter 534 increments by one upon writing to the same element position of the array D in the preceding cycle, data is written to a next element position of the array A. Because the capacity in the element direction of the preload register groups 4-0~3 is finite, when the value of the write counter becomes equal to the capacity in the element direction of the preload register groups 4-0~3, the write counter 534 wraps around to zero. To implement this operation, the write counter W (534) is operated as shown in FIG. 10.

Figure 10:
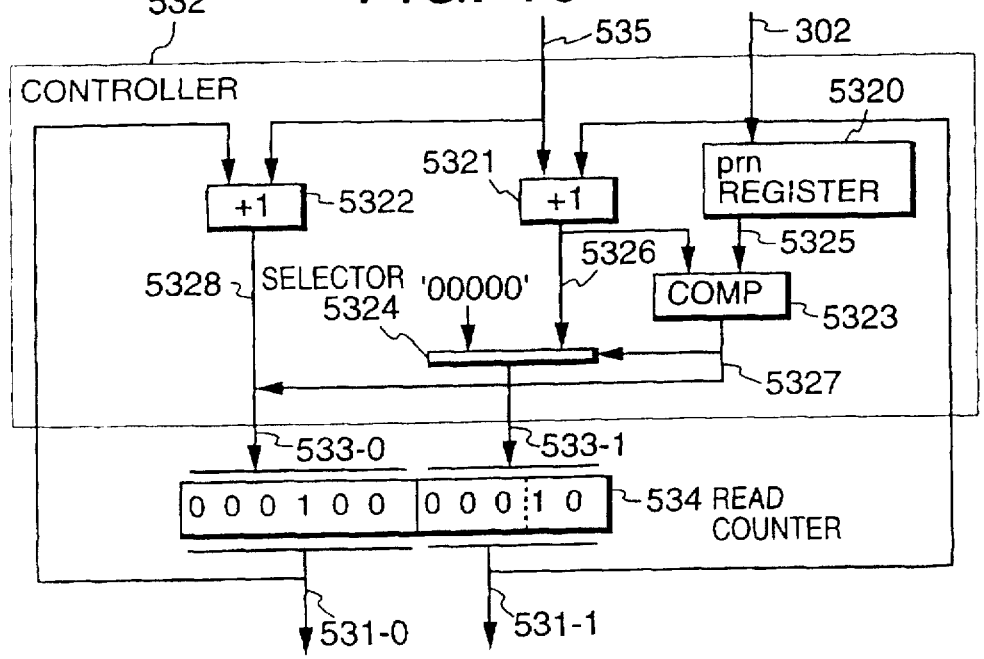
FIG. 10 is a block diagram for describing a count-up operation of a write counter of FIG. 6.

Referring to FIG. 10, there are shown the controller 532 and the write counter W (534) in binary representation. The capacity of each preload register PR in the element direction is 64 elements. Namely, the low-order five bits of the write counter W (534) represent 32 PR numbers while the high-order six bits represent element numbers. The controller 532 stores, via the signal line 302 into a register 5320, the number of preload registers to be used now among the preload registers in each buffer, the number being 00100 that indicates 4, and controls the write counter W (534) as follows.

Basically, the controller 532 increments by one the least significant bit of the write counter W (534) via an adder 5321 every time the controller 532 is instructed by the signal line 535 for writing to the preload register groups 4-0~3. The low-order five bits are output onto the signal line 531-1 as PR numbers. Since the controller stores that only four preload registers are in use, the controller 532 monitors through a comparator 5323 for a carry to the third bit from the least significant bit at the time of increment. If the carry is detected, the controller 532 controls the setting of a selector 5324 and an output 5328 of an adder 5322 to the high-order six bits such that the detected carry is carried to the high-order six bits. The high-order six bits are output to a signal line 531-0 as an element number. When the PR0, the PR1, the PR2, and the PR3 have been thus written, the writing can be made to the position following the PR0. When an overflow from the most significant bit occurs, the value of the write counter 534 is wrapped around to zero. This permits the writing from the lowest position of the PR0 again when all element positions of the four preload registers have been completed.

Thus, the selection of all write positions of the preload register groups 4-0, 4-1, 4-2, and 4-3 is controlled by the value of the signal line 531, the four array elements read by the simultaneously issued preload requests are written to the preload register group 4 at the same element position synchronously.

Consequently, the four pieces of data preloaded from the main storage in parallel are distributed to the four preload registers and written to sequentially different storage positions. Namely, as shown in FIG. 4, in the preload register groups 4-0, 4-1, 4-2, and 4-3, data A(1), A(2), A(3), and A(4) are first written to the PR0 (namely, 400-0, 401-0, 402-0, and 403-0) in parallel simultaneously and data B(2), B(4), B(6), and B(8) are written to the PR1 (namely, 400-1, 401-1, 402-1, and 403-1) in parallel simultaneously. Data D(1), D(2), D(3), and D(4) are written to the PR2. Then, data A(5), A(6), A(7), and A(8) are written to the PR0 again. Further, the data have been written to all element positions of the PR0, PR1, PR2, and PR3, data are written over the first element position (A(1) in FIG. 4) in the PR0. The overwriting to the first element position is performed after overwrite data is read by the processor. The control for this operation will be described later.

It should be noted that, for the value of the write counter 534, information whether an increment has been made in that cycle is output onto a signal line 544. This value is also used to guarantee the order of data read/write operations by the ordering control unit.

(5) Reading preloaded data by the processor Each of the processors is programmed such that the processor uses a plurality of pieces of data held in a preload register group corresponding to that processor in the order these data were preloaded.

For example, FIG. 3B shows an example of a machine-language instruction string to be executed in each processor to perform the loop processing of FIG. 2. This instruction string is executed by the processors 3-0~3 independently. The instruction string includes a plurality of load (LD)

instructions for specifying preload register groups. As will be described, in the first embodiment, when these instructions are executed, the preload unit 2 is adapted to sequentially read a plurality of pieces of data in the order in which these instructions are executed, the plurality of pieces of data having been preloaded in a preload register group, 4-0 for example, corresponding to the processor, 3-0 for example, that executes the instruction string.

In the program of FIG. 3B, when the instruction (1), the first load instruction (LD) for specifying the preload register PR, is executed, the 0th element in the PR0 in the preload register corresponding to that processor is read. In other words, this instruction requests loading of this data into a general-purpose register GR0, not shown, in that processor. Namely, in the case of the processor 3-0 for example, the array element A(1) is loaded. Likewise, when the instructions (2) and (3) are executed, the array element B(2) is loaded in a general-purpose register GR1, not shown, the array element C(2) in the general-purpose register G2, not shown, and the array element D(1) in the general-purpose register G5, not shown. In this loop, the processing executed by the instructions (1) through (8) is repeated by the loop length N/4 times. It will be apparent that, in the repetition, when any of the preload requesting instructions is executed again, subsequent preloaded data is read.

In the above-mentioned example, data A(1), B(2), C(2), D(1), A(5), ... are read from the preload register group 4-0 in this order. Therefore, this machine-language instruction string must be programmed such that a plurality of pieces of data preloaded in the preload register group corresponding to each processor are used in the order in which these pieces of data were preloaded.

Meanwhile, when the load instruction for specifying a preload register group is executed in any processor 3-i (i=0, 1, 2 or 3), that processor supplies a load request RQi to the read control unit 560 of the preload unit 2.

Figure 7:
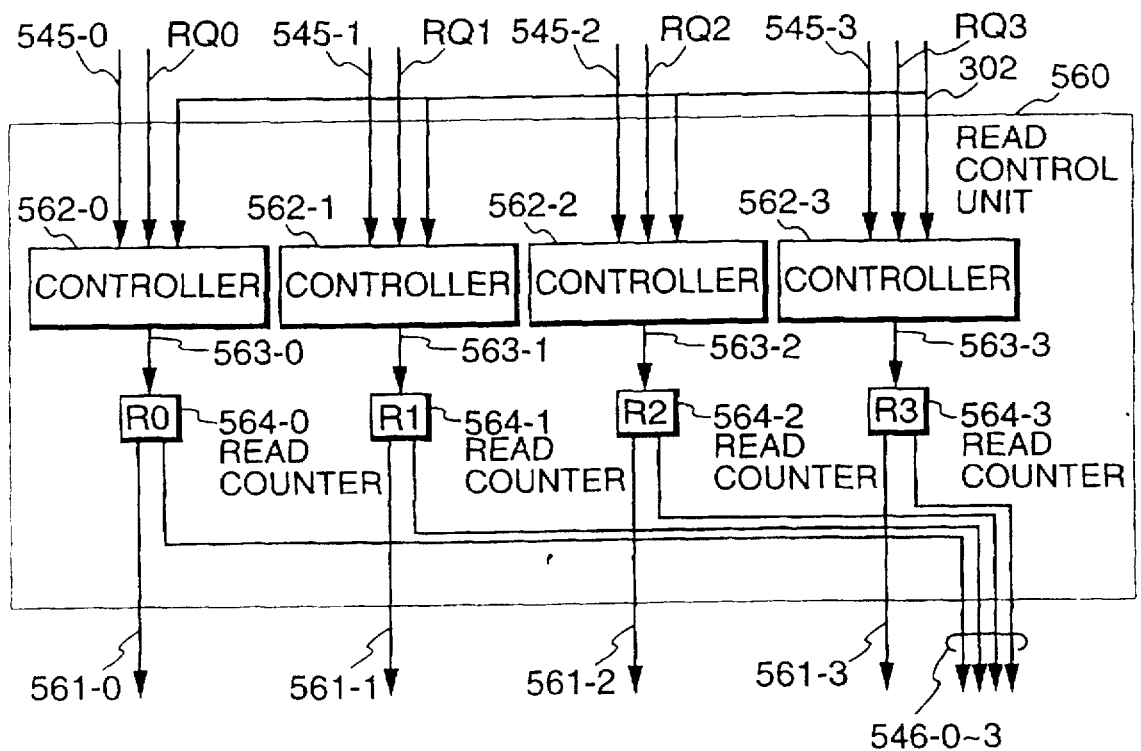
FIG. 7 is a block diagram illustrating a read control unit for the preload registers, as used in the system of FIG. 1.

Now, referring to FIG. 7, there is shown a block diagram illustrating the read control unit 560. The read control unit receives load requests RQ0–3 independently and asynchronously coming from the processors 3-0–3 that are operating independently and asynchronously with each other. If necessary data are already written to the preload register group 4, the read control unit outputs the data onto the signal lines 561-0–3; if not, the read control unit inhibits the output. Whether the necessary data are already written to the preload register group 4 is notified from the ordering control unit 540 via the signal lines 545-0–3 in a manner to be described.

When the load request RQi comes from the processor 3-i, the read control unit 560 controls the read operation on the preload register group 4-i via the signal line 561-i. At this moment, the data held in the preload register 400-i are read in the order in which the data were preloaded via the signal lines 430-0–3, 431-0–3, 432-0–3, and 433-0–3 and the selectors 440, 441, 442, and 443 to be sent to the processor 3-i via a signal line Di.

Read counters R0, R1, R2, and R3 (564-0–3) provided for the processors respectively are used to control the reading of data from which element position of which preload register. As described earlier, the processors 3-0–3 operate independently of each other and therefore read data from the preload registers independently, so that the preload register numbers and element numbers read by each processor are independent of those read from other processors.

Controllers 562-0–3 increment the read counters (R0–3) 564-0–3 via the signal lines 563-0–3 to read the preload register groups 4-0–3 via the signal lines 561-0–3 only when the values of the signal lines 545-0–3 indicate completion of writing and the load requests RQ0–3 have been sent. The method of specifying read element positions in the preload register groups 4-0–3 by the read counters R0–3 (564-0–3) and the method of incrementing the read counters R0–3 (564-0–3) are the same as those for the write counter 534. That is, the controllers 562-0–3 obtain, in advance via the signal line 302, information about the number of preload registers to be used and increment the read counters R0–3 (564-0–3) such that the low-order five bits of these counters indicate four PR numbers and the high-order six bits indicate element numbers. Since the load requests RQ0–3 from the processors are sent independently, the values of the read counters R0, R1, R2, and R3 are incremented independently of each other. Therefore, the read positions in the preload register groups 4-0, 4-1, 4-2, and 4-3 may differ from each other.

Information indicating whether the read counters R0, R1, R2, and R3 (564-0–3) have been incremented in their respective cycles is also sent to the ordering control unit 540 via signal lines 546-0–3.

(6) The ordering control unit

Figure 8:
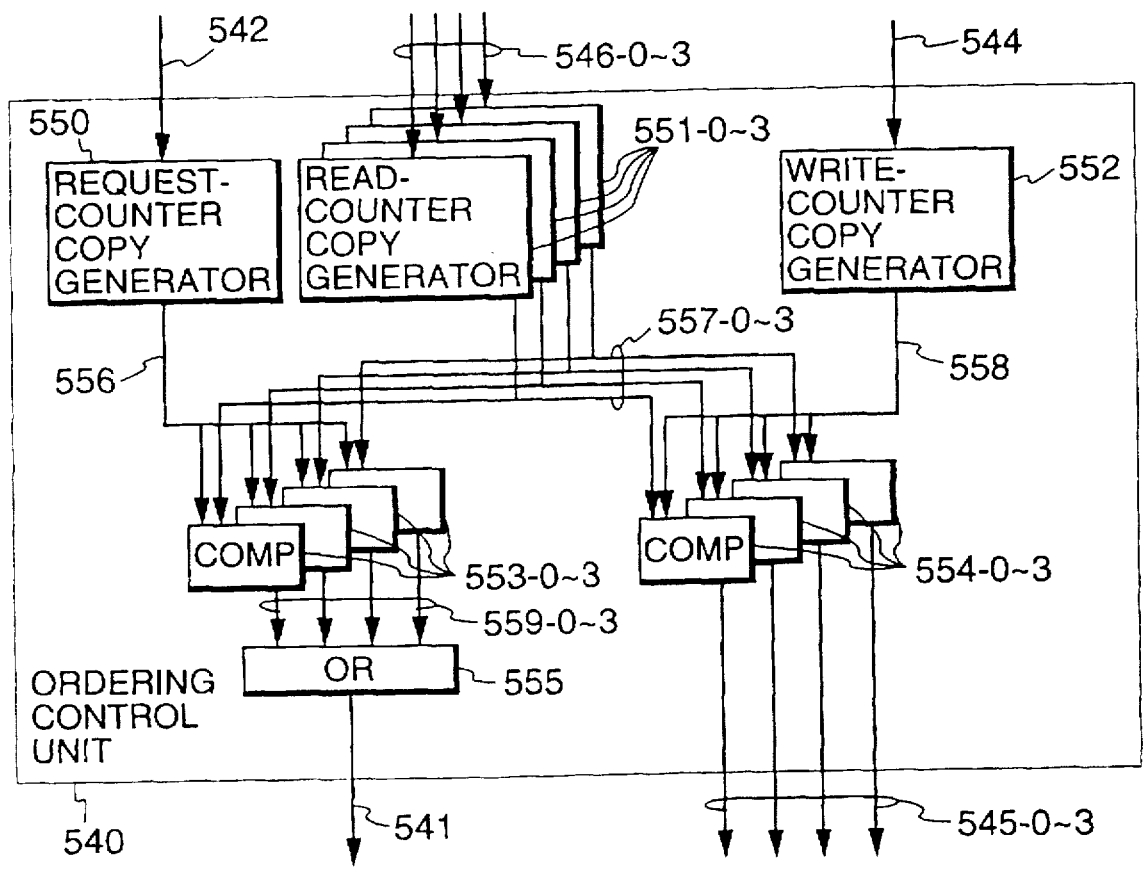
FIG. 8 is a block diagram illustrating a preload register read/write ordering control unit as used in the system of FIG. 1.

Referring to FIG. 8, there is shown a block diagram illustrating the ordering control unit 540. The signal line 542 indicates whether the request counter RQ (521) has been incremented. Namely, this signal indicates whether the preload requests A0–3 have been sent to the main storage 1. The signal lines 546-0–3 indicate whether the read counters R0-3 (564-0–3) have been incremented. Namely, these signals indicate whether the processors 3-0–3 have read data from the preload register group 4. The signal line 544 indicates whether the write counter W 534 has been incremented. Namely, this signal indicates whether data has been written from the main storage 1 to the preload register group 4. On the other hand, the signal 541, an output signal, instructs the preload request unit 500 to inhibit the sending of preload requests. The output signals 545-0–3 are output to the read control unit 560 to indicate for the processor whether the data to be read are already written to the preload register group 4.

Whether a preload request is to be inhibited or not is determined as follows.

It is necessary to prevent a preload request from being sent, when the preload request overwrites new data over data held in a preload register but not yet read therefrom. For this purpose, when the value of the request counter RQ (521) becomes nearly equal to any of the values of the read counters R0–3 (564-0–3), the preload request inhibit signal 541 is sent. When the predetermined number of pieces of data have been preloaded in each buffer or, to be specific in the first embodiment, when data have been preloaded up to the capacities of the four preload registers in each buffer, if the data that have been read are held in each buffer, new data are preloaded to be written to positions at which the data that have been read are still held in each buffer. However, of the data that have been read are still held in each buffer, when the number of pieces of data not read by the processor corresponding to that buffer has reached zero, preloading of new data is inhibited.

Reference numeral 550 indicates a request-counter copy generator for generating a copy of the value of the request counter RQ (521) based on the value of the signal line 542. Reference numerals 551-0–3 indicate read-counter copy generator for generating copies of the read counters R0–3 (564-0–3) based on the values of the signal lines 546-0–3. It should be noted that, by use of the signal lines 542 and 546-0–3, the values of the request counter RQ (521) and R0-3 (564-0~3) may be received directly. Comparators 553-0~3 add one to the value of the request counter RQ (521) received from the signal line 556 and compares the result with the values of the read counters R0~3 (564-0~3) received via signal lines 557-0~3. When a match is found, the comparators output one onto signal lines 559-0~3. If an overflow occurs from the most significant bit at adding one to the copy of the value of the request counter RQ (521), the counter wraps around to zero. An OR circuit 555 outputs one onto the signal line 541 when any of the signal lines 559-0~3 is one. As a result, if a preload request is issued in the next cycle and one is added to the value of the request counter RQ (521, the preload request inhibit signal 541 is sent when the value of the request counter RQ (521) becomes equal to any of the values of the read counters R0~3 (564-0~3).

Meanwhile, whether the data to be read has already been written is determined by each processor based on whether the value of each of the read counters R0~3 (564-0~3) is smaller than the value of the write counter W (534).

Reference numeral 552 indicates a write-counter copy generator for generating a copy of the value of the write counter W (534) based on the value of the signal line 544. It will be apparent that the value of the write counter W (534) may be directly received by using the signal line 544. Comparators 554-0~3 subtract a copy of the value of the read counters R0~3 (564-0~3) from a copy of the value of the write counter W (534) received via signal lines 558 and 557-0~3 and, if the result is two or higher, output one onto the signal lines 545-0~3. If the result is two or higher, it indicates that the data have already been written to the preload register group even if the data are read in the next cycle.

Thus, the ordering control unit 540 can control the preload request unit 500, the write control unit 530, and the read control unit 560 such that new preload data is not overwritten to a position at which preload data not yet read is held and writing of data to a preload register is not overtaken by reading of data to that preload register.

As described, by controlling the sending of a preload request, the writing of preload data, and the reading of preload data, accesses to the main storage can be performed collectively (for an enhanced efficiency because the memory accesses are often made at continuous addresses), while the operations of the processors can be performed independently of each other (for an enhanced availability of each processor).

<Embodiment 2>

In the second preferred embodiment of the invention, a plurality of pieces of data to be stored in a main storage are temporarily stored by a plurality of scalar processors sharing the main storage in a buffer corresponding to each of the processors to be collectively poststored in the main storage.

(1) Overview of the system

Figure 11:
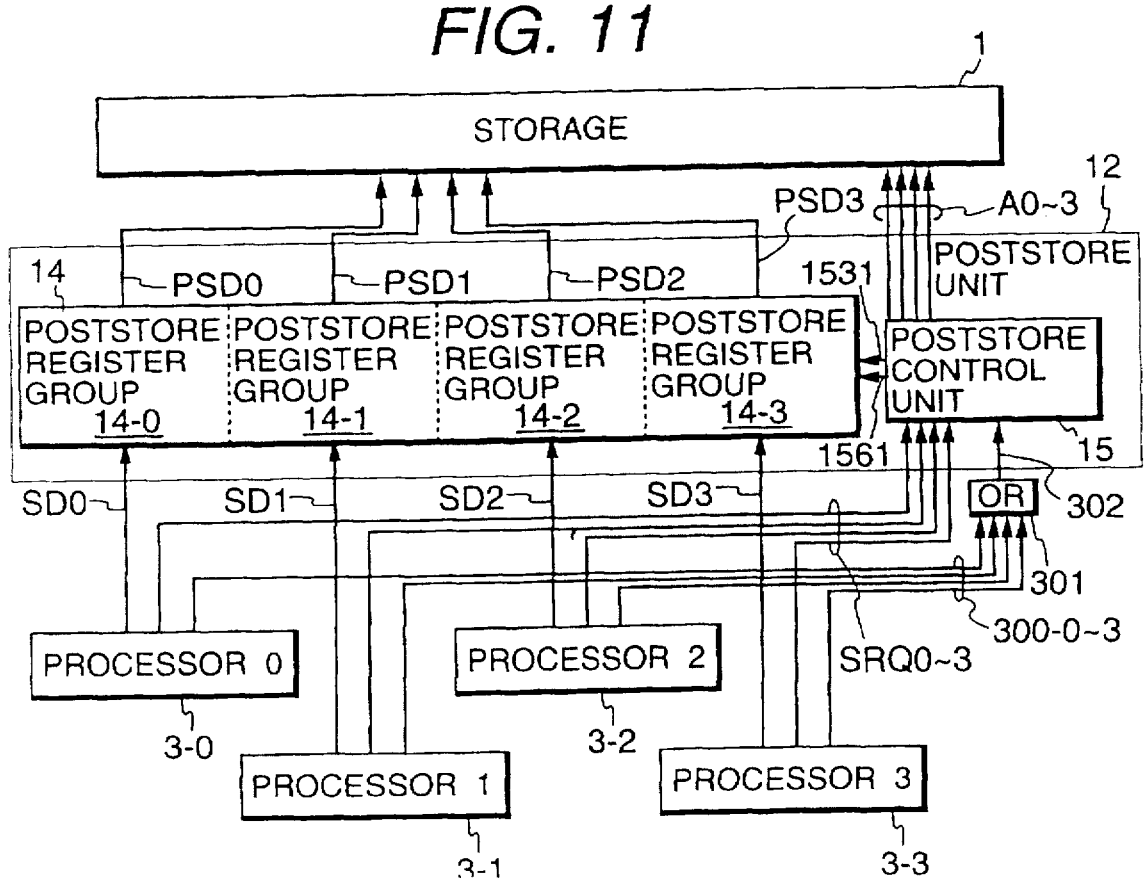
FIG. 11 is an overall block diagram illustrating a data processor system capable of poststoring array data, practiced as a second preferred embodiment of the invention.

Referring to FIG. 11, processors 3-0~3 process a DO loop of FORTRAN of FIG. 12 in a distributed manner. A poststore unit 12 is provided between a main storage 1 and the processors 3-0~3. The poststore unit 12 is largely divided into a poststore control unit 15 and poststore register groups 14 for holding data to be poststored. The poststore register groups 14 are divided into poststore register groups 14-0~3 respectively corresponding to the processors 3-0~3.

The constitution and operation of the second embodiment is different from the first embodiment in that preload is replaced with poststore but generally similar to the first embodiment in the collective processing of data of a plurality of arrays. Therefore, in what follows, the difference will be mainly described in brief.

Before executing the DO loop in the distributed manner, any of the processors 3-0~3 indicate, to the poststore control unit 15, poststore information including start addresses and strides of all arrays A, B, C, and D in the DO loop, loop length N, and data distribution mode of the processor, via signal lines 300-0~3, an OR circuit 301, and a signal line 302. In what follows, the operation in which cyclic distribution is specified as the data distribution mode will be described mainly.

Then, the processors 3-0~3 execute the loop processing independently. When data to be stored in the main storage 1 is obtained during the execution, the processors send store requests SRQ0~3 to the poststore control unit 15 and, at the same time, send store data SD0~3 to poststore register groups 14-0~3 respectively corresponding to the processors. The poststore control unit 15 controls the writing of the store data to the poststore register groups 14-0~3 by a signal line 1561. When the data have been accumulated in the poststore register groups 14-0~3 to a certain amount, the poststore control unit 15 calculates addresses A0~3 of array elements to be stored by the processors 3-0~3 based on the previously indicated poststore information, sends the calculated addresses to the main storage 1 collectively, reads poststore data PSD0~3 from the poststore register groups 14-0~3 by control of a signal line 1531, and sends the read poststore data to the main storage 1.

Referring to FIGS. 13A and 13B, there are shown machine-language instruction strings for executing the DO loop of FIG. 12.

The setup processing of FIG. 13A is generally the same as that of the preload processing. In FIG. 13A, stride registers SR0~3 and base registers BR0~3 indicate address information about corresponding poststore registers (PSR).

The loop processing of FIG. 13B is executed by each of the processors 3-0~3 independently. Zero is preset to a general-purpose register GR10, not shown, provided in each processor. When a poststore register group 14-0~3 is specified by an ST (STore) instruction of (1), contents of the general-purpose register GR0, not shown, in that processor are stored in the poststore register PSR0 in the poststore register group 14-0~3 corresponding to that processor, starting with the lowest element position in the poststore register. By the following ST instructions (2) through (4), contents of general-purpose registers GR1, GR2, and GR3 are stored in PSR1, PSR2, and PSR3 in the poststore register groups corresponding to the processors, starting with lowest element positions in the registers. This operation is repeated by loop length N/4 times.

In the second embodiment, when storing a plurality of pieces of array data appearing in the loop processing into the main storage, each processor does not store a plurality of elements of one array continuously; rather, the processor sequentially stores a plurality of elements of sequentially different arrays. Consequently, in the second embodiment, the store instructions of FIG. 13B request the storage of array data A, B, C, and D in this order. As a result, the elements of array A(I), array B(I×2), array C(I+1), and array D(I) are sequentially stored in the poststore register group 14-0~3 according to cyclic distribution in the distributed manner. The arrays A, B, C, and D stored in the poststore register group 14-0~3 are then automatically stored in the main storage 1 by the poststore control unit 15.

Figure 14:
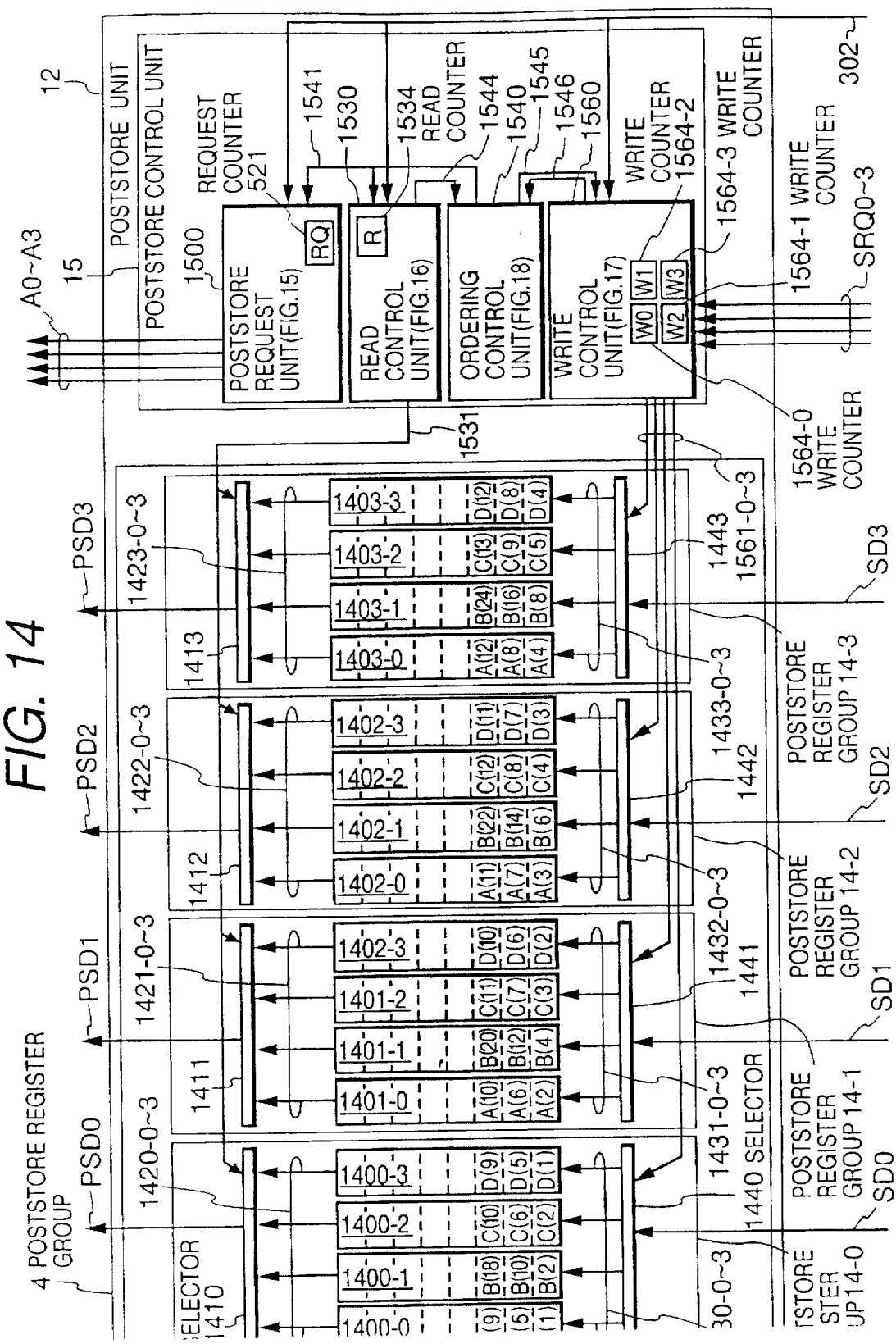
FIG. 14 is a block diagram illustrating poststore register groups and a poststore control unit as used in the system of FIG. 11.

The following describes the operation of the poststore unit 12 for the above-mentioned operations to be performed correctly. FIG. 14 shows a block diagram illustrating the poststore unit 12.

The poststore register groups 14 include the poststore register groups 14-0~3, each group having poststore registers (PSR) 0–31. In FIG. 14, only four of the poststore registers are shown for simplicity. Reference numerals 1400-0, 1401-0, 1402-0, and 1403-0 indicate PSR0 in each of the poststore register groups 14-0, 1, 2, and 3. Reference numerals 1400-1, 1401-1, 1402-1, and 1403-1 indicate PSR1 in each of the poststore register groups. Reference numeral s 1400-2, 1401-2, 1402-2, and 1403-2 indicate PSR2 in each of the poststore register groups. Reference numerals 1400-3, 1401-3, 1402-3, and 1403-3 indicate PSR3 in each of the poststore register groups.

The poststore control unit 15 incorporates a poststore request unit 1500, a read control unit 1530, an ordering control unit 1540, and a write control unit 1560.

When a store request is sent from the processor 3-0~3 via the signal line SRQ0~3, the write control unit 1560 controls the writing of data SD0~3 to the poststore register groups 14 via the signal lines 1561-0~3 and selectors 1440, 1441, 1442, and 1443. Write counters W0, W1, W2, and W3 (1564-0~3) corresponding to the processors are used to control to which element position of which poststore register the data are to be written. The operations of the processors 3-0~3 are performed independently and the operations to write data to the poststore registers are also performed independently, so that poststore register numbers and element numbers of the data to be written by the processors are independent of each other. In each poststore register, each element of an array is stored cyclically.

The read control unit 1530 controls the reading of the data PSD0~3 from the poststore register groups 4 via the signal line 1531 and the selectors 1410, 1411, 1412, and 1413. A read counter R is used to control from which element position in which poststore register the data is to be read. The reading starts from the same element position of the same PSR in the poststore register groups 14-0~3.

Setup information sent from any of the processors 3-0~3 in advance is set to a length register LR, a distribution register DR, a base register BR, and a stride register SR in the poststore request unit 1500 via the signal line 302. Based on the information thus set, the poststore request unit 1500 calculates an address of store data from each processor and, in synchronization with reading of data by the read control unit 1530 to the PSD0~3, sends the address to the signal lines A0~3 to issue a poststore request to the main storage 1. A request counter RQ (521) is used to count the number of poststore requests issued.

The ordering control unit 1540 controls the write control unit 1560, the read control unit 1530, and the poststore request unit 1500 via signal lines 1541, 1544, 1545, and 1546 such that the writing of data from the processor to the poststore register is not overtaken by the reading by the poststore request and a position at which poststore data not yet read is held is not overwritten by another piece of store data.

The following describes the operations of the write control unit 1560, the read control unit 1530, the poststore request unit 1500, and the ordering control unit 1540 in this order.

(2) The write control unit 1560

Figure 17:
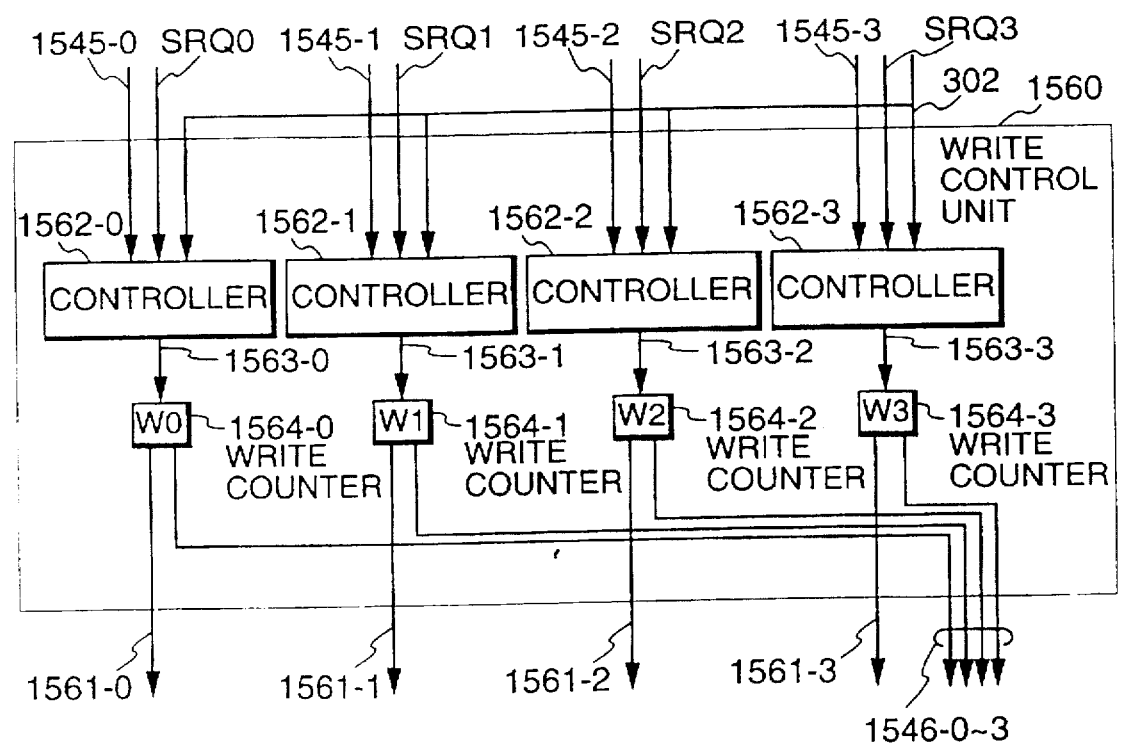
FIG. 17 is a block diagram illustrating a read write control unit for the poststore registers, as used in the system of FIG. 11.

Referring to FIG. 17, there is shown a block diagram of the write control unit 1560. The write control unit 1560 receives store requests SRQ0~3 sent independently and asynchronously from the processors 3-0~3 operating independently and asynchronously and writes the store data to the poststore register groups 14. If the store request coming from the processors 3-0~3 overwrites data that have not yet been poststored, the write control unit inhibits that store request. Whether the store request should be inhibited or not is informed by the signal lines 1545-0~3 coming from the ordering control unit 1540. Controllers 1562-0~3 increment the write counters W0~3 (1564-0~3) via signal lines 1563-0~3 to write the data to the poststore register groups 14-0~3 via the signal lines 1561-0~3 only when the value of the signal lines 1545-0~3 indicates that the store request need not be inhibited and the store request SRQ0~3 has been sent. The values of the write counters W0~3 (1564-0~3), the method of counter increment, and the correspondence of write positions in the poststore register groups 14 are the same as those of the preload processing. Since the signals SRQ0~3 are sent independently of each other, the write counters W0 (1564-0), W1 (1564-1), W2 (1564-2), and W3 (1564-3) are incremented independently and the write positions in the poststore register groups 14-0, 14-1, 14-2, and 14-3 may be different. Information indicating whether each of the write counters W0 (1564-0), W1 (1564-1), W2 (1564-2), and W3 (1564-3) has been incremented in that cycle is output to the ordering control unit 1540 via the signal line 1546-0~3.

(3) The read control unit 1530

Figure 16:
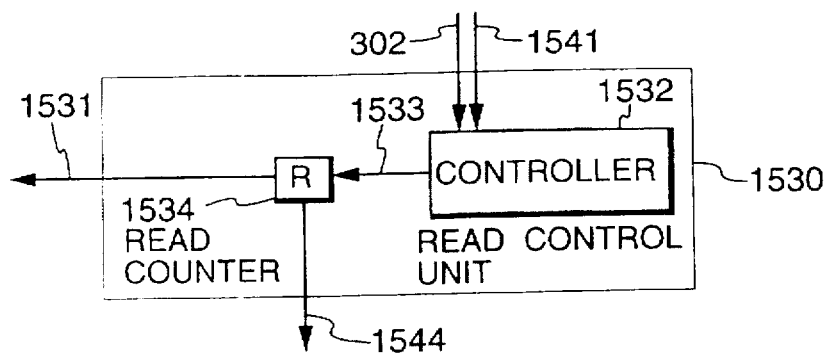
FIG. 16 is a block diagram illustrating a read control unit for the poststore registers, as used in the system of FIG. 11.

Referring to FIG. 16, there is shown a block diagram illustrating the read control unit 1530. The read control unit 1530 generates the control signal 1531 to control the selectors 1410, 1411, 1412, and 1413 such that data are read from appropriate positions in the poststore register groups 14 according to a poststore activation signal 1541 coming from the ordering control unit 1540. To be more specific, a controller 1532 increments a read counter R (1534) only when it has received the activation signal 1541, the incremented value being output onto the signal line 1531. The values on the read counter R (1534), the method of increment, and the correspondence of read positions in the poststore register groups 14 are the same as those of the preload processing. Because the selection of all read positions in the poststore register groups 14-0, 14-1, 14-2, and 14-3 is controlled by the value on the signal line 1531, data are read from the poststore register groups 14 at the same element position of the same PSR. Information indicating whether the read counter R (1534) has been incremented in that cycle is output onto the signal line 1544 to be used to guarantee the ordering of the data read/write operations by the ordering control unit 1540.

(4) The poststore request unit 1500

Figure 15:
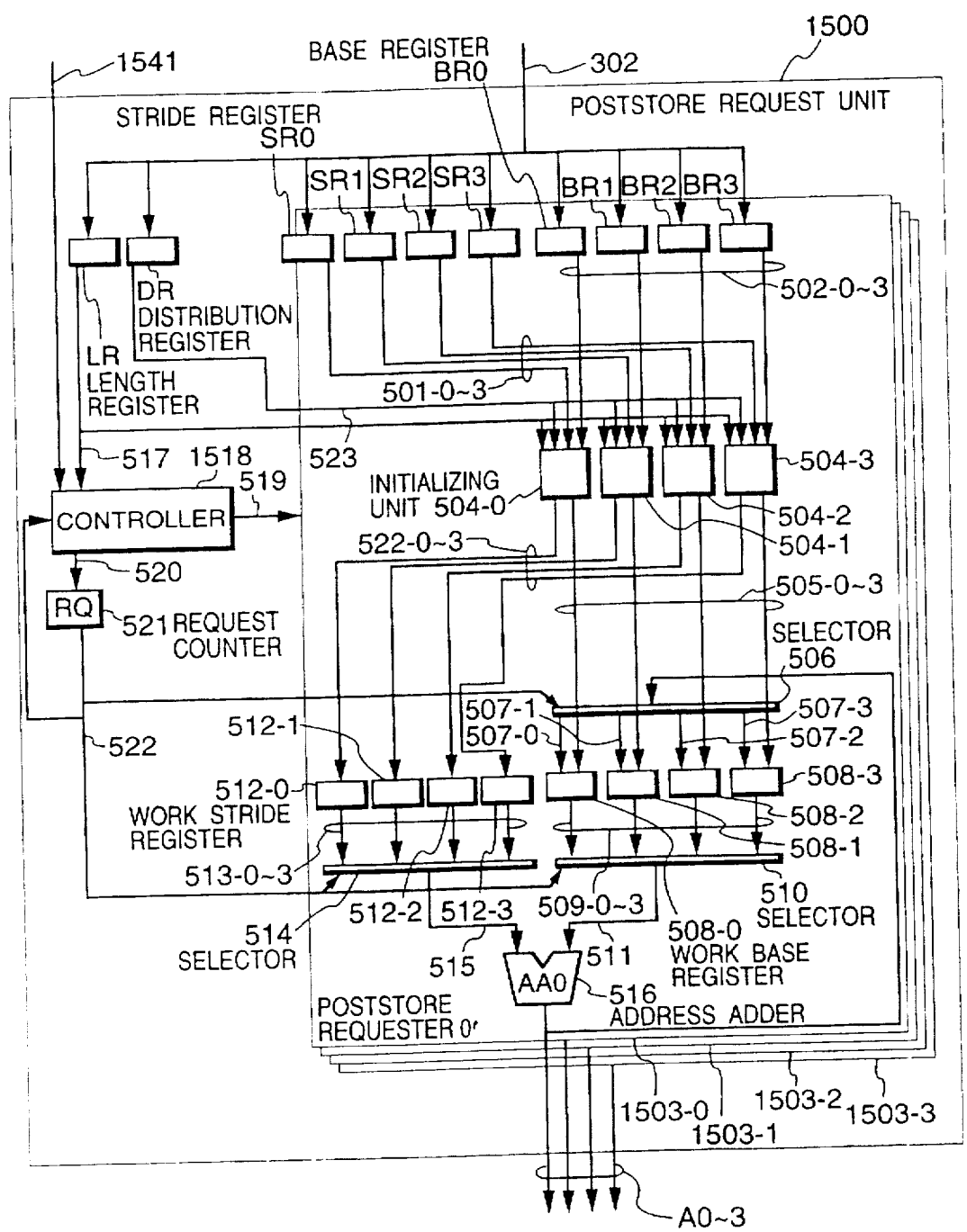
FIG. 15 is a block diagram illustrating a poststore request unit as used in the system of FIG. 11.

Referring to FIG. 15, there is shown a block diagram illustrating the poststore request unit 1500. The constitution and operation of the poststore request unit 1500 are substantially the same as those of the preload request unit 500. The components of the poststore request unit 500 that operate in the same manner as those of the preload request unit 500 are denoted by the same reference numerals.

The poststore request unit 1500 contains a request counter RQ (521), a length register LR, a distribution register DR, 32 base registers BR, and 32 stride registers SR. In FIG. 15, only four base registers and only four stride registers are shown for simplicity. Also, poststore requesters 0~3 (1503-0~3) are provided corresponding to the processors 3-0~3 respectively.

Setup information sent from any of the processors 3-0~3 is entered in the poststore request unit 1500 via the signal line 302 to be set to the length register LR, the distribution register DR, the stride registers 0~3, and the base registers 0~3. The setup information is then captured in the poststore requesters 0~3 (1503-0~3) to be used for calculating the addresses A0~3 corresponding to the processors. Since all poststore requesters 0~3 (1503-0~3) operate in substantially the same manner, the following describes the operation of the poststore requesters by using the poststore requester 0 (1503-0) by way of example.

The poststore requester 0 (1503-0) contains work base registers 508-0~3, work stride registers 512-0~3, and an address adder 516, by which an address is calculated in every cycle. The poststore requester 0 further contains initializing units 504-0~3 that initialize the work base registers 508-0~3 and the work stride registers 512-0~3 so that the element addresses corresponding to the processor 3-0 can be calculated. The method of initialization is the same as that by the preload requester 503-0.

When the poststore activation signal 1541 has been entered from the ordering control unit 1540 and the processing for the full loop length has not been completed, the poststore request unit 1500 sends a poststore request every cycle A0~3. A controller 1518 controls this operation. To be more specific, the controller 1518 counts the number of times the poststore requests have been sent and increment the request counter RQ (521) via a signal line 420. If the signal line 541 indicates activation and the number of times poststore requests have been sent does not exceed the value of the length register LR obtained via a signal line 517 times the total number of arrays (four in this example) divided by the number of processors (four in this example), the controller 1518 sends the activation signal 519 to the poststore requesters 0~3 (1503-0~3). The poststore requesters 0~3 (1503-0~3) calculates addresses only for a cycle in which the value of the activation signal 519 is valid and sends the signals A0~3.

The method of address calculation is the same as that of the preload requester 503-0.

Since the poststore requesters 1503-0~3 synchronously operate by control of the signal line 519, the poststore request unit 1500 can issue a poststore request to the main storage 1 with respect to the same indexes in all arrays. Further, in the cyclic distribution, the addresses A0~3 are often continuous, so that the poststore request unit 1500 can issue continuous access requests to the main storage 1 collectively.

(5) The ordering control unit 1540

Figure 18:
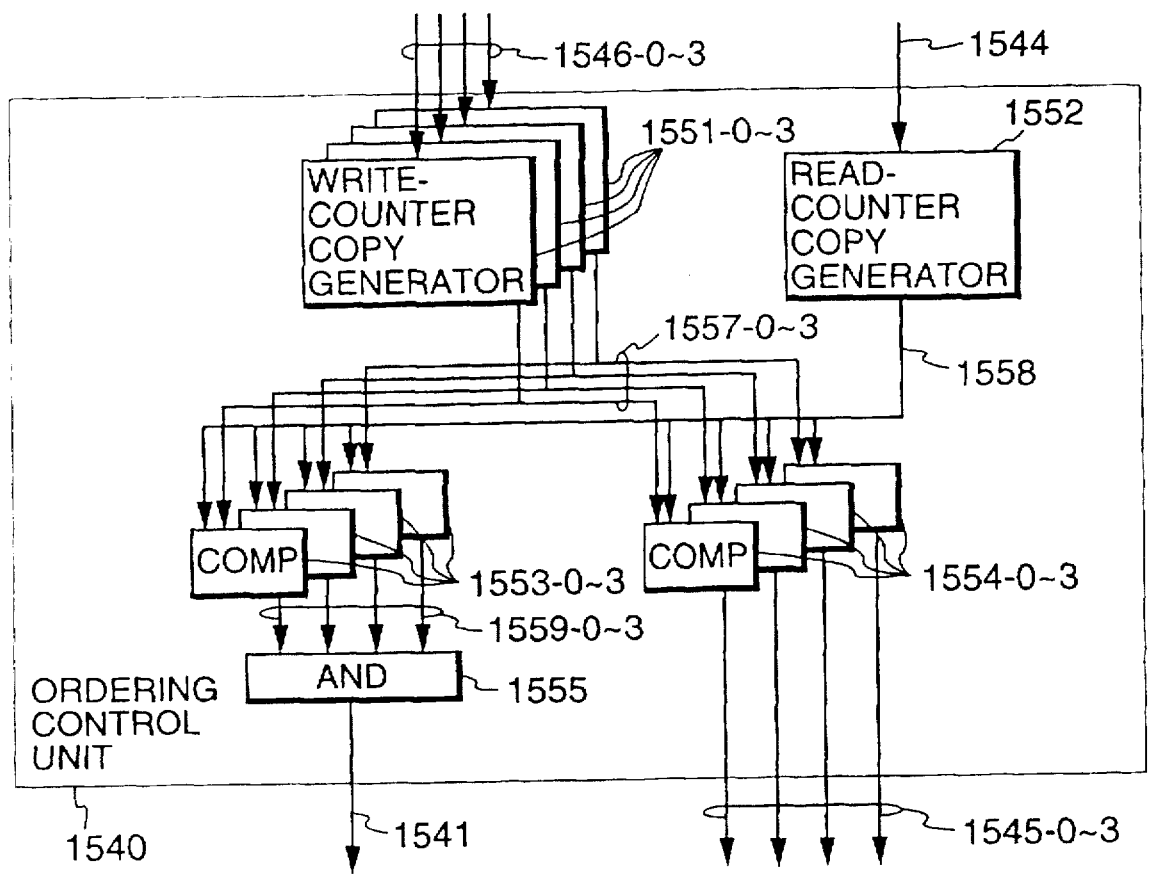
FIG. 18 is a block diagram illustrating a read/write ordering control unit for the poststore registers, as used in the system of FIG. 11.

Referring to FIG. 18, there is shown a block diagram illustrating the ordering control unit 1540. The ordering control unit 1540 receives the signal lines 1546-0~3 indicating whether each of the write counters W0~3 (1546-0~3 has been incremented in that cycle and the signal line 1544 indicating whether the read counter R (1534) has been incremented to generate the store inhibit signals 1545-0~3 corresponding to the processors and the poststore activation signal 1541.

Whether to inhibit the store operation or not is determined as follows.

It is necessary to prevent a poststore request from being sent, the preload request being intended to overwrite new data to a poststore register holding data not yet read in order to reuse the poststore register. For this purpose, when the value of the write counter W0~3 (1564-0~3) becomes nearly equal to the value of the read counter R (1534), the store inhibit signals 1545-0~3 are sent to the corresponding processors.

Reference numerals 1551-0~3 indicate write-counter copy generators for generating copies of values of the write counter W0~3 (1564-0~3) based on values of the signal lines 1546-0~3. Reference numeral 1552 indicates a read-counter copy generator for generating a copy of a value of the read counter R (1534) based on a value of the signal line 1544. It should be noted that the values of the write counters W0~3 (1564-0~3) and the read counter R (1534) may be directly received by using the signal lines 1546-0~3 and 1544. Comparators 1554-0~3 subtract the copy of the value of the write counters W0~3 (1564-0~3) from the copy of the value of the read counter R (1534) received via the signal lines 1558 and 1557-0~3 respectively. If the result is one or less, one is output onto the signal lines 559-0~3. When the write counter W0~3 (1564-0~3) is incremented by one as a result of a store operation in the following cycle, the store inhibit signals 1545-0~3 are sent to the corresponding processors every time the value of the write counter W0~3 (1564-0~3) becomes equal to the value of the read counter R (1534).

Meanwhile, for activation of a poststore operation, it is necessary for the poststore data to have been written from a processor to a poststore register group. Hence, the poststore operation is activated when the values of all write counters W0~3 are greater than the value of the read counter R.

Comparators 1553-0~3 output one onto the signal lines 545-0~3 when a value obtained by subtracting the copy of the value of the read counter R (1534) from the copy of the value of the write counter W0~3 (1564-0~3) is two or higher. When the value is two or higher, it indicates that the data have been written to the preload register group if read in the following cycle.

Thus, the ordering control unit 1540 controls the read control unit 1530 such that the writing of data to the poststore register is not overtaken by the reading by a poststore operation and, at the same time, controls the write control unit 1560 such that new store data are not overwritten to the position at which poststore data not yet read are held.

<Embodiment 3>

In the first preferred embodiment, each of the preload register groups 4-0~3 has 32 preload registers but, if the machine-language instruction string in the program to be executed by the processors of the first embodiment specifies only four preload registers, only the specified four registers are used. The third embodiment is a variation of the first embodiment in that, if the number of preload registers specified by the machine-language instruction string is small, all preload registers can be used for performing a preload operation. To be more specific, an embodied system is configured such that the 32 preload registers are divided in groups each consisting of a plurality of combined registers to make the number of groups logically seem to be the number of preload registers specified by the instruction string, four for example.

(1) Definition of terms

Figure 19:
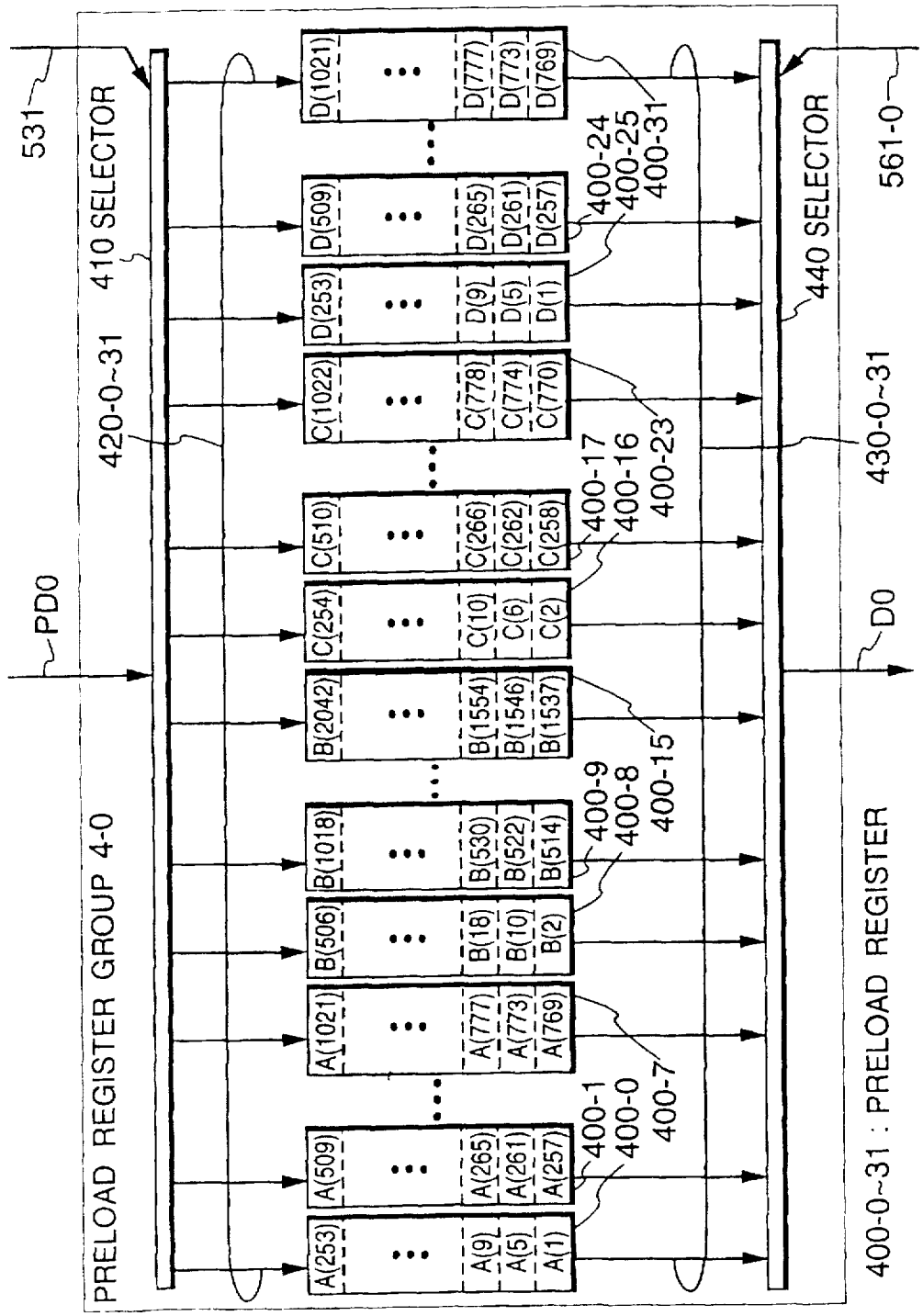
FIG. 19 is a block diagram illustrating preload register groups as used in a data processor system practiced as a third preferred embodiment of the invention.

The overall constitution of the system practiced as the third preferred embodiment is generally the same as that of FIG. 1. Each of the preload register groups 4-0~3 provided for the processors 3-0~3 has 32 preload registers 400-0~31. FIG. 19 shows only the preload register groups 4-1. In the third embodiment, the preload registers 400-0~3 actually installed on hardware are called minimum unit preload registers (IPR). The preload registers are divided into groups each consisting of a plurality of combined preload registers and logically handled as one preload register (PR).

(2) Overall operation

In what follows, execution of a preload operation will be described. Control of a poststore operation will be easily understood on the analogy of this third embodiment.

Referring to FIG. 19, the preload register group 4-0 has 32 minimum unit preload registers IPR (400-0~31), each of which holds 64 elements. The same holds true with the other preload register groups 4-1, 4-2, and 4-3.

When implementing the DO loop of FIG. 2, the same machine-language instruction strings as with the first embodiment as shown in FIGS. 3A and 3B are used. However, the preload unit 2 interprets the machine-language instruction string somewhat differently from the case of the first embodiment. Namely, when it is indicated that the number of PRs used is four by the instruction (1) of FIG. 3A, thirtytwo IPRs are combined in units of eight. The resultant four groups of IPRs each consisting of eight IPRs are interpreted as PR0–3 to be specified by the machine-language instruction string. When the preload register group 4-0 is taken for example, 400-0–7 is taken for PR0, 400-8–15 for PR1, 400-16–23 for PR2, and 400-24–31 for PR3, each being regarded as a preload register having 512 elements (64×8). For the element numbers in each preload register, the element positions 0–63 of 400-0 become the elements 0–63 of PR0 and the element positions 0–63 of 400-1 become the elements 64–127 of PR0. The same holds true with 400-2 and so on until the element positions 0–63 of 400-7 are taken for the elements 448–511 of PR0. Namely, the preload unit 2 operates as if there were four preload registers corresponding to the four processors, each of the preload registers having 512 elements.

The method of initializing the preload request unit 500 and the method of incrementing the write counter W (534) and the read counters R0–3 (564-0–3) for performing the above-mentioned control are different from those of the first embodiment. These methods will be described with reference to FIGS. 20 through 22.

Figure 20:
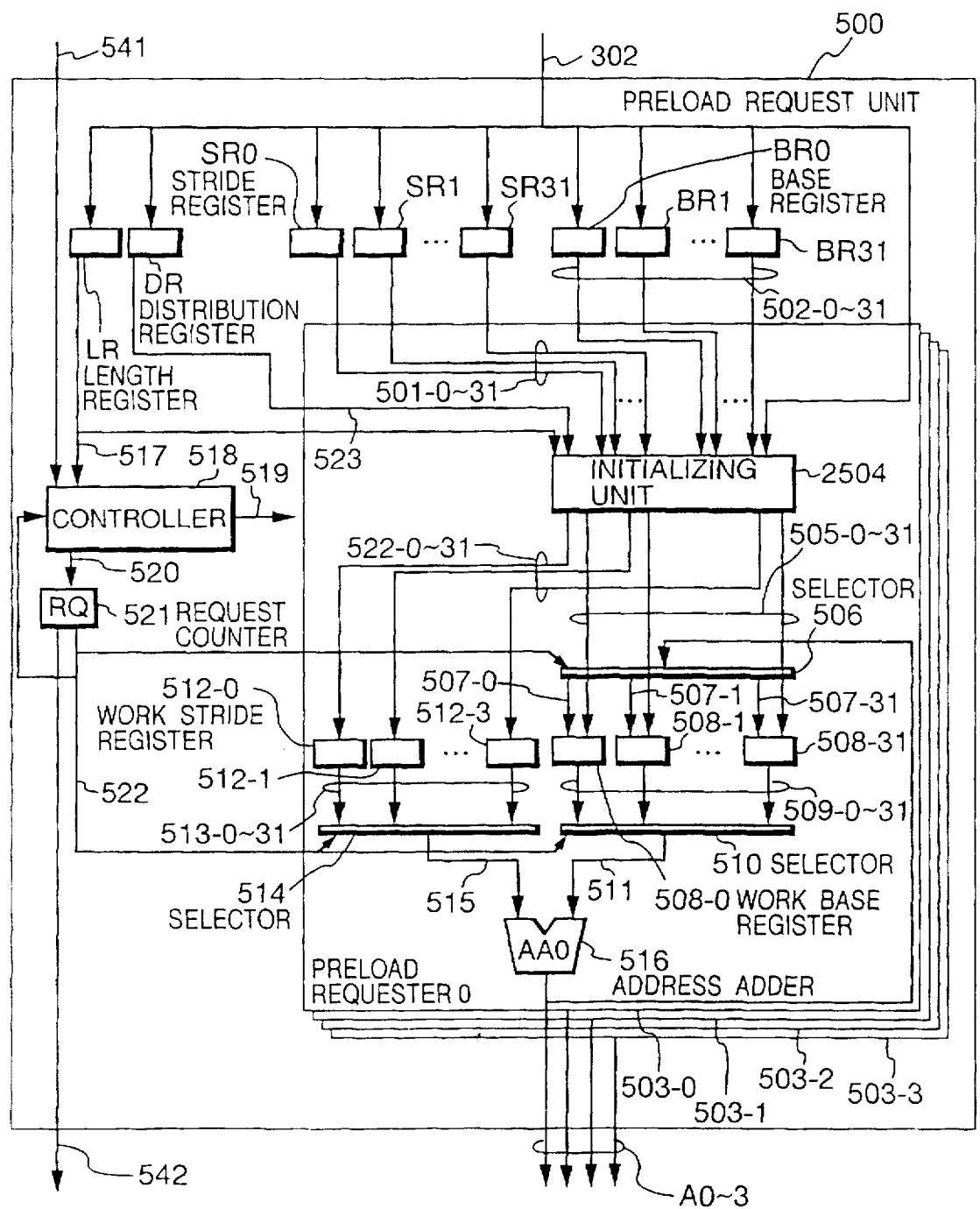
FIG. 20 is a block diagram illustrating a preload request unit as used in the system of FIG. 19.

(3) Method of initializing the preload request unit When the instruction (1) of FIG. 3A is executed, an instruction for dividing the 32 IPRs into four groups each consisting of a plurality of combined IPRs is transmitted to the preload request unit 500 of FIG. 20 via the signal line 302. When the instructions (2) through (11) are executed, loop length N is set to the length register LR, the data distribution mode of the processor is set to the distribution register DR, the start addresses of arrays A, B, C, and D are set to the base registers BR0–3 respectively, and the access strides to the arrays A, B, C, and D with accesses of all processors collected are set to the stride registers SR0–3. The initializing unit 2504 generates the signals shown in FIG. 21 on lines 505-0–31 and 522-0–31, based upon the information that the total number of IPR's is four and the information held in the length register LR, the distribution register DR, the base registers BR0–31, and the stride registers SR0–31. Thus, the work base registers 508-0–31 and the work stride registers 512-0–31 have been set so that each minimum unit preload register IPR can load from the storage 1 an appropriate portion of data to be loaded in the combined preload registers. The following describes in particular how each array element has been set to be loaded in what portion of each IPR.

Figures 21, 22:
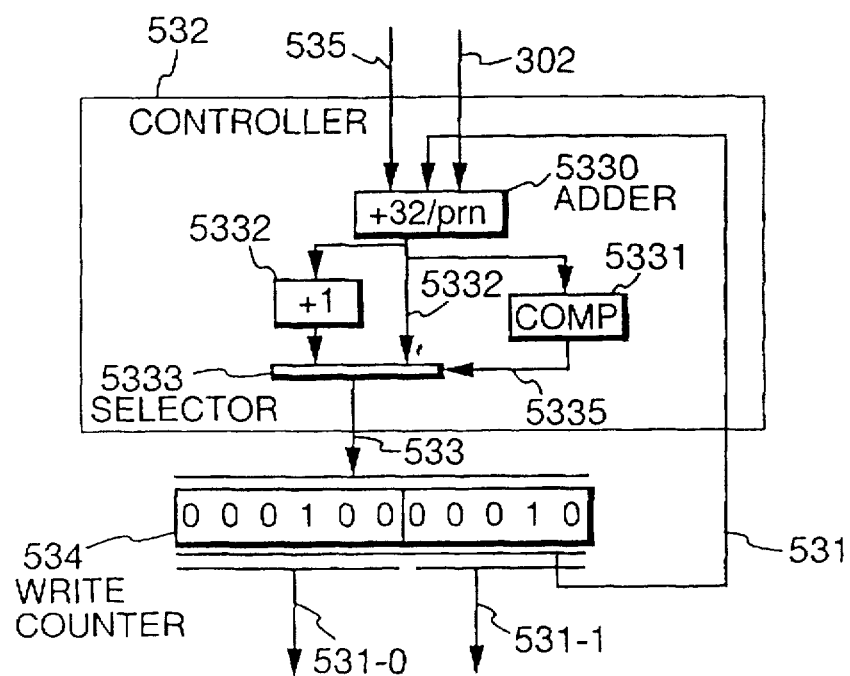
FIG. 21 is a table listing values of address-associated information to be set by an initializing circuit as used in the system of FIG. 19.
FIG. 22 is a block diagram for describing a count-up operation of a write counter in the system of FIG. 19.

Referring to FIG. 21, there is shown a table listing outputs onto the signal lines 505-0–3 indicating array initial addresses for each IPR and the signal lines 522-0–31 indicating stride addresses with processor number being p and IPR number being n in the preload requesters 0–3 corresponding to the processors 3-0–3. Let the number of preload registers used by specification of the machine-language instruction string be prn (four in the case of the instruction string of FIG. 2), then the IPRs are combined in units of j=32/prn (in this example, 32/4=8). When i and k where n=i×j+k are obtained, i indicates that the n-th IPR corresponds to which PR and k indicates that the n-th IPR in the combined i-th PR is which IPR from the start. In the cyclic distribution mode, array elements should be stored one by one like PR0, PR1 and so on. Therefore, the value that should be set as the array start address of the start IPR of each PR is BRi+SRi×p as with FIG. 9A (the start IPR means k=0). Each IPR holds 64 elements and each array element is processed by the sequentially different processors, so that the value that should be set as the array start address of the k-th IPR of each PR is a value obtained by adding SRi×4 ×64×k to the above-mentioned value. The stride address is SRi×4 regardless of the IPR number. Meanwhile, in the block distribution mode, each PR is processed by dividing the total loop length LR by the number of processors, namely four in this example, so that the value that should be set as the array start address of the start IPR of each PR is BRi+SRi×LR/4×p as with FIG. 9A. Because each IPR holds 64 elements, the value that should be set as the array start address of the k-th IPR of each PR is a value obtained by adding SRi×64×k to the above-mentioned value. The stride address is SRi regardless of the IPR number.

(4) Updating the write and read counters

Thus, the appropriate address has been set. Now, the increment of the write counter W (534) and the read counters R0–3 (564-0–3) is controlled so that the appropriate read/write operations are performed on the appropriate element positions in the appropriate order.

Referring to FIG. 22, there is shown a block diagram illustrating the controller 532 and the write counter W (534). The write counter 534 represents a count value in binary notation. That is, the low-order five bits (531-1) represent 32 IPR numbers while the high-order six bits (531-0) represent the IPR element numbers.

The present embodiment of controller 532 is to be used in the embodiment of the write control unit 530 (FIG. 2) in FIG. 6, as used in the first embodiment. The controller 532 of FIG. 22 is informed by the signal line 302 in advance that the 32 IPRs are divided into four groups. Basically, the controller 532, every time the writing to the preload register groups 4-0–3 is instructed via the signal line 535, increments the least significant bit of the write counter W (534) by eight (32/4=8) by means of an adder 5330. This permits the writing to element 1 of IPR0 after writing to element 0 of IPR0, element 0 of IPR8, element 0 of IPR16, and element 0 of IPR24. Namely, sequential writing can be performed on the arrays A, B, C, and D with respect to the same index.

After writing to element 63 of IPR24, adding eight to the write counter W (534) causes an overflow from the most significant bit. A comparator 5331 monitors the overflow and controls a selector 5333 such that the value on the write counter W (534) generated by an adder 5332 is wrapped around, one is added to the wrapped-around result, and the added result is set to the write counter W (534). This subsequently permits the specification of element 0 of IPR1, element 0 of IPR9, element 0 of IPR17, element 0 of IPR25 and the write addresses thereof, followed by the sequentially writing of the arrays A, B, C, and D with respect to the same index. Further, when eight is added to the write counter W (534) after writing to element 63 of IPR25, an overflow from the most significant bit occurs, the wrapped-around value becoming one. Adding one to this value again subsequently permits writing to element 0 of IPR2.

The read counters R0–3 (564-0–3) are controlled in the same manner as the write counter.

Thus, the above-mentioned control allows the minimum unit preload registers to be divided into groups each consisting of a plurality of combined minimum unit preload registers to be accessed as logically one register, thereby providing the preload registers in the number corresponding to the number of arrays that appear in a program.

<Embodiment 4>

The fourth preferred embodiment is a variation to the first preferred embodiment in that the number of pieces of data that is more than one multiple of the number of processors can be preloaded by a single access to the main storage. Therefore, the following describes the differences from the first embodiment. In the following description, the multiple used is two, for example. The concept of the fourth embodiment holds true with a poststore operation and may also be applied to the third embodiment.

The overall constitution of the fourth embodiment is generally the same as that of FIG. 1 except that A0~3 and PD0~3 are duplicated and preload data and main storage addresses for two elements are sent in a single cycle.

The machine-language instruction strings of the program to be executed are the same as those of FIGS. 3A and 3B. If a preload operation is performed in a unit twice as large as the number of processors, the program need not be modified in any manner, the processors 3-0~3 reading data, element by element, from the preload register groups 4-0~3.

In the fourth embodiment, the constitution of the preload unit of FIG. 2 is modified as follows.

The signal lines 420-0~3, 421-0~3, 422-0~3, and 423-0~3 are duplicated and the preload data for two elements are processed in a single cycle. The data are written to a preload register indicated by the signal line 531 at a specified element position and an element position obtained by adding one to that specified element position.

Figure 23:
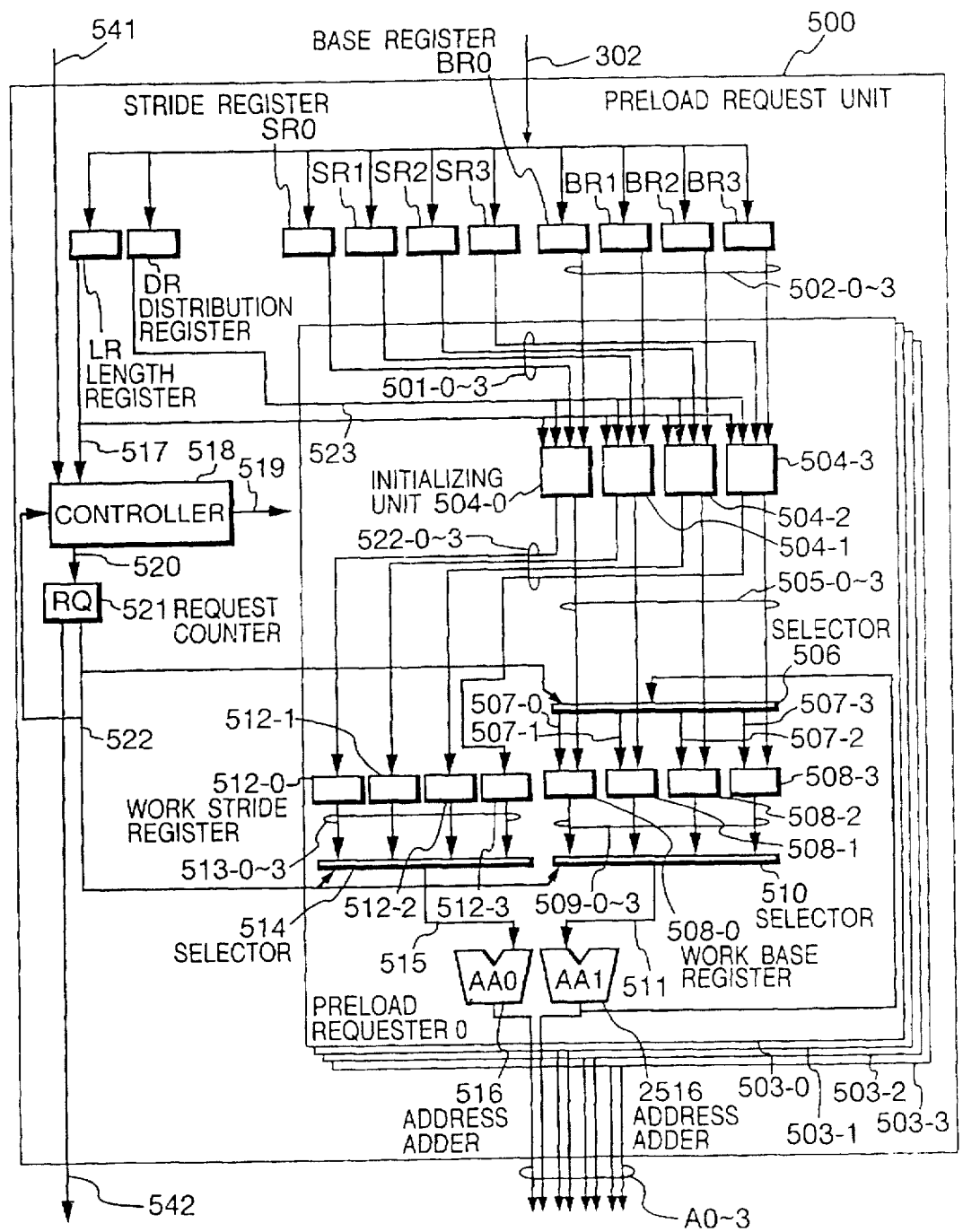
FIG. 23 is a block diagram illustrating a preload request unit as used in a data processor system practiced as a fourth preferred embodiment of the invention.

The preload request unit 500 of FIG. 5 is added with an address adder 2516 for each of the preload requesters 503-0~3 as shown in FIG. 23. In FIG. 23, the method of initializing the work base registers 507-0~3 and the work stride registers 512-0~3 is the same as that of FIG. 5. The controller 518 sends the preload activation signal 519 to the preload requesters 0~3 (503-0~3) unless the value of the signal line 541 indicates inhibition of preloading and the number of transmitted preload requests exceeds the value of the length register LR obtained via the signal line 517 times the total number of arrays divided by the number of processors divided by two.

The preload requesters 503-0, every time it receives the activation signal 519, perform address calculation by using two adders 516 and 2516 to send two preload requests via the signal line A0. The address calculation is performed as follows. Namely, as with FIG. 5, the address adder 516 adds together the values of work base register and work stride register obtained via the signal lines 511 and 515 to output the result onto the signal line A0. The address adder 2516 doubles the value of work stride register obtained via the signal line 515 and adds the result to the value of work base register obtained via the signal line 511 to output the final result onto the signal line A0. The work base register that has been read is updated to the output value of the address adder 2516.

The methods of incrementing the request counter RQ (521) and selecting work base registers and work stride registers based on the incremented value are the same as those of FIG. 5. Namely, each work base register and work stride register are switched between arrays A and B every time the request counter RQ (521) is incremented. As with FIG. 5, information is output onto the signal line 542, the information indicating whether the request counter RQ (521) has been incremented in that cycle. When the signal line 542 indicates that the counter has been incremented, it indicates that the preload request transmission for two elements has been performed.

The constitution and operation of the write control unit 530 are the same as those of FIG. 6. The operation of the write counter 534 is almost the same as that of FIG. 10. However, when all arrays have been preloaded with respect to the same index, it is necessary to make control such that the write counter 534 indicates the element position subsequent to the next element position. To effect this control, when a carry is made to the lower third bit of the write counter 534 in FIG. 10, the controller 532 adds two to the high-order six bits. To the signal line 544 of FIG. 6, information indicating whether the write counter 534 has been incremented in that cycle is output; if this signal line indicates the increment, it indicates that data for two elements have been written.

The constitution and operation of the read control unit 560 are the same as those of FIG. 7. The operations of the read counter R0~3 are the same as those of the embodiment. Namely, when a carry is made to the lower third bit of the read counter R0~3 (564-0~3), one is added to the high-order six bits. The signal lines 546-0~3 indicate that the read counters R0~3 (564-0~3) have been incremented. When these signal lines indicate the increment, it indicates that data for one element have been read.

The constitution of the ordering control unit 540 is generally the same as that of FIG. 8. However, the signal line 542 indicates that a preload request for two elements has been made; the signal line 544 indicates that writing by preloading for two elements has been performed; and the signal lines 546-0~3 indicate that reading by preloading for one element has been performed. Consequently, in the request counter copy generator 550, when the signal is received from the signal line 542, two is added to the copy of the value of the request counter. In the read counter copy generators 551-0~3, when signals are received from the signal lines 546-0~3, one is added to the copy of the value of the read counter. In the write counter copy generator 522, when the signal is received from the signal line 544, two is added to the copy of the value of the write counter. The comparators 553-0~3 add two to the copy of the value of the request counter received from the signal line 556. If the result of this addition is equal to the copy of the value of the read counter received from the signal line 557-0~3, the comparator outputs one onto the signal line 559-0~3. It should be noted that the operation of the comparators 554-0~3 is the same as that of FIG. 8.

As described above, the ordering control unit 540 properly controls the preload request unit 500, the write control unit 530, and the read control unit 560 such that the data writing to preload registers is not overtaken by the reading by a load request and a new piece of preload data is not overwritten to the position at which preload data not yet read is held.

As described and according to the first aspect of the invention, there is provided a data processor system having a simple circuit constitution suitable for preloading a plurality of groups of data such as a plurality of arrays processed by a plurality of scalar processors in a distributed manner and included in the processing from storage positions having continuous addresses in the main storage having multi-bank constitution.

As described and according to the second aspect of the invention, there is provided a data processor system having a simple circuit constitution suitable for poststoring a plurality of groups of data such as generated as a result of the processing by a plurality of scalar processors in a distributed manner to storage positions having continuous addresses in the main storage having multi-bank constitution.

As described and according to the third aspect of the invention, there is provided a data processor system having a simple circuit constitution to allow a group of data to be preloaded, the group of data being used in iterative processing in which the data are processed by a plurality of scalar processors in a distributed manner in excess of the capacity of preload cache.

While the preferred embodiments of the present invention have been described using specific terms, such description is for illustrative purposes only, and it is to be understood that changes and variations may be made without departing from the spirit or scope of the appended claims.

What is claimed is:

1. A data processor system, comprising:

a storage for holding data;

a plurality of processors;

a plurality of buffers interposed between said storage and said plurality of processors, each of said buffers being provided in correspondence to one of said plurality of processors;

a storage read circuit provided in common to said plurality of buffers and responsive to a preload request issued by one of said plurality of processors for reading a plurality of data groups as designated by said preload request from said storage, in such a manner that each of said data groups is divided into a plurality of partial data groups, said partial data groups belonging to different ones of said data groups are read out sequentially from said storage according to an order of said plurality of data groups, as designated by said preload request, and a plurality of data belonging to each of said partial data groups corresponding to each of said data groups are read out in parallel from said storage;

a buffer write circuit connected to said storage and said plurality of buffers for writing a plurality of data included in each of said partial data groups as read out from said storage into different ones of said plurality of buffers in parallel; and a plurality of buffer read circuits, each of said buffer read circuits being provided in correspondence to and connected to one of said plurality of buffers, each of said buffer read circuits responding to a plurality of load requests supplied by a corresponding one of said plurality of processors for sequentially reading out a plurality of data held in one of said plurality of buffers corresponding to said each of said buffer read circuits according to an order of writing of said plurality of data into said corresponding buffer, and further supplying said plurality of data as read out to said corresponding processor, said corresponding processor being provided in correspondence to said corresponding buffer.

2. A data processor system according to claim 1, wherein said storage read circuit includes:

a plurality of read request circuits, each provided in correspondence to one of said plurality of buffers, for sequentially supplying a plurality of read requests required to read a plurality of data from said storage to be supplied to a corresponding one of said plurality of processors provided in correspondence to one of said plurality of buffers provided in correspondence to said each of said read request circuits, and a circuit connected to said plurality of read request circuits for supplying said storage with a plurality of read requests in parallel, said plurality of read requests being supplied respectively by said plurality of read request circuits; and wherein each read request circuit includes:

a plurality of address generating circuits, each sequentially generating a plurality of addresses required to read part of a plurality of data belonging to one data group within said plurality of data groups as designated by said preload request, and a circuit for sequentially selecting a plurality of addresses generated by said plurality of address generating circuits and for sequentially supplying a plurality of read requests, each of which including one of said plurality of addresses as selected, wherein said selecting is executed according to a predetermined order of said plurality of address generating circuits, wherein a plurality of addresses generated by each of said address generating circuits includes a plurality of addresses of a plurality of data which belong to different ones of a plurality of partial data groups constituting one data group within said plurality of data groups and are to be supplied to one of said plurality of processors which corresponds to one of said plurality of buffers to which said each read request circuit corresponds.

3. A data processor system according to claim 2, further comprising:

a plurality of data storage circuits, each being provided in correspondence to one of said plurality of address generating circuits, each data storage circuit being selectable by at least one of said plurality of processors; and a circuit connected to said plurality of data storage circuits and said at least one processor for storing each of a plurality of preload information as designated by said at least one processor into one of said plurality of data storage circuits as designated by said at least one processor for said each preload information, each preload information designating one data group to be preloaded within said plurality of data groups;

wherein each address generating circuit within each of said read request circuits includes a circuit for sequentially generating a plurality of addresses required to read a plurality of data which belong to different ones of a plurality of partial data groups constituting one data group within said plurality of data groups and are to be supplied to one of said plurality of processors which corresponds to one of said plurality of buffers to which said each read request circuit corresponds, wherein said one data group is one designated by preload information stored in one of said plurality of data storage circuits provided in correspondence to said each address generating circuit.

4. A data processor system according to claim 1, wherein each buffer comprises a plurality of sequentially-ordered partial regions;

wherein said buffer write circuit includes a circuit for sequentially switching partial regions within each buffer into each of which said partial regions data to be written in said each buffer is written, within a plurality of data included in one of said plurality of partial data groups as sequentially read out, wherein said switching is executed according to a predetermined order of said partial regions within each buffer and at readout of different ones of said plurality of partial data groups;

wherein each buffer read circuit includes a circuit responsive to a plurality of read requests supplied by one of said plurality of processors corresponding to said each buffer read circuit for sequentially reading a plurality of data from a plurality of partial regions within one of said plurality of buffers corresponding to said each buffer read circuit, wherein partial regions from which said plurality of data are read out are varied sequentially according to a predetermined order of partial regions.

5. A data processor system according to claim 1, wherein each buffer comprises a plurality of sequentially-ordered partial regions;

wherein said buffer write circuit includes a circuit for writing said plurality of partial data groups which have been read out from said storage into said plurality of buffers, in such a manner that said plurality of partial regions within each buffer are divided into a plurality of partial region groups which are equal in number to a group number of data groups to be preloaded as designated by said preload request, and in such a manner that a plurality of data to be processed by each of said plurality of processors, within said plurality partial data groups as read out from said storage are sequentially written into ones of said plurality of partial region groups within one of said plurality of buffers corresponding to said each processor, wherein said ones of said plurality of partial regions varies according to a predetermined order of partial region groups; and wherein each buffer read circuit includes a circuit responsive to a plurality of read requests supplied by one of said plurality of processors corresponding to said each buffer read circuit for sequentially reading a plurality of data from ones of said plurality of partial region groups within one of said plurality of buffers corresponding to said each buffer read circuit, wherein said ones of said plurality of partial regions sequentially varies according to said predetermined order of partial region groups.

6. A data processor system according to claim 1, wherein each buffer comprises a plurality of sequentially-ordered partial regions;

wherein said storage read circuit includes a circuit for reading said plurality of data groups as designated by said preload request from said storage, in such a manner that a plurality of partial data groups belonging to different data groups are read out sequentially from said storage according to said order of data group but a plurality of partial data groups belonging to one data group are read out in parallel from said storage, each time when one partial data group belonging to said one data group is to be read next, wherein said plurality of partial data groups comprises said one partial data group and at least one other partial data group next in order to said one partial data group, within a plurality of partial data belonging to said one data group;

wherein said buffer write circuit includes a circuit for writing into said plurality of buffers, a plurality of data belonging a plurality of partial data groups read out in parallel by said storage read circuit, so that a plurality of data to be processed by each of said plurality of processors within said plurality of partial data groups read out in parallel by said storage read circuit are written in parallel into different partial regions within one of said plurality of buffers corresponding to said each processor.

7. A data processor system, comprising:

a storage for holding data;

a plurality of processors;

a plurality of buffers interposed between said storage and said plurality of processors, each of said buffers being provided in correspondence to one of said plurality of processors;

a storage read circuit provided in common to said plurality of buffers and responsive to a preload request issued by one of said plurality of processors for reading a plurality of data groups as designated by said preload request from said storage, in such a manner that each of said data groups is divided into a plurality of partial data groups, said partial data groups belonging to different ones of said data groups are read out sequentially from said storage according to an order of said plurality of data groups, as designated by said preload request, and a plurality of data belonging to each of said partial data groups corresponding to each of said data groups are read out in parallel from said storage;

a buffer write circuit connected to said storage and said plurality of buffers for writing a plurality of data included in each of said partial data groups as read out from said storage into different ones of said plurality of buffers in parallel;

a plurality of buffer read circuits, each of said buffer read circuits being provided in correspondence to and connected to one of said plurality of buffers, each of said buffer read circuits responding to a plurality of load requests supplied by a corresponding one of said plurality of processors for sequentially reading out a plurality of data held in one of said plurality of buffers corresponding to said each of said buffer read circuits according to an order of writing of said plurality of data into said corresponding buffer, and further supplying said plurality of data as read out to said corresponding processor, said corresponding processor being provided in correspondence to said corresponding buffer;

a circuit for detecting total numbers of a plurality of currently held and already read out data for said plurality of buffers, and for detecting whether one of said detected total numbers has reached zero, each of said total numbers of a plurality of currently held and already read out data representing a total number of a plurality of data already read out to one of said plurality of processors corresponding to one of said plurality of buffers among a plurality of data currently held in said corresponding buffer; and a circuit, connected to said circuit for detecting, for prohibiting said storage read circuit from reading a partial data group from said storage, in response to detection by said circuit for detecting that one of said detected total numbers has reached zero;

wherein said buffer write circuit includes a circuit for writing data to be written into each buffer within a partial data group read out by said storage read circuit from said storage into a location within said each buffer which holds data already written by said buffer write circuit and already read out to one of said processors corresponding to said each buffer, said partial data group being one which has been read out from said storage by said storage read circuit without prohibition by said circuit for prohibiting.

8. A data processor system according to claim 7, further comprising:

a plurality of detection circuits each provided in correspondence to one of said plurality of buffers, each detection circuit detecting whether a total number of a plurality of data not yet read from one of said plurality of buffers corresponding to said each detection circuit has become zero, said plurality of data not yet read including a plurality of data already written into said corresponding buffer but not yet read out to one of said plurality of processors corresponding to said corresponding buffer; and a circuit, connected to said plurality of circuits for detecting, for prohibiting one of said plurality of buffer read circuits provided in correspondence to each of said plurality of buffer from reading data from said each buffer to one of said plurality of processors corresponding to said each buffer, in response to detection by one of said plurality of detection circuits corresponding to said each buffer that a total number of a plurality of data already written into said each buffer but not yet read out has become zero.

9. A data processor system, comprising:

a storage for holding data;

a plurality of processors;

a plurality of buffers interposed between said storage and said plurality of processors, each buffer being provided in correspondence to one of said plurality of processors;

a buffer write circuit connected to said plurality of processors and said plurality of buffers and responsive to a plurality of write requests issued by each of said plurality of processors for sequentially writing a plurality of data supplied by said each processor into sequentially varying ones within a plurality of storage regions within one of said plurality of buffers corresponding to said each processor according to an order of storage regions;

a buffer read circuit, connected to and provided in common to said plurality of buffers and connected to at least one of said plurality of processors, responsive to a poststore request issued by said at least one of said plurality of processors for reading a plurality of data to be poststored into said storage from said plurality of buffers in such a manner that a plurality of data to be preloaded are divided into a plurality of partial data groups and said plurality of partial data groups are read sequentially group by group, each partial data group including a plurality of data held in one storage location group within a plurality of storage location groups, each storage location group including a plurality of mutually corresponding storage locations within said plurality of buffers, said plurality of partial data groups being read in such a manner that a plurality of data held in each buffer are sequentially read out according to said order of storage locations and a plurality of data belonging to a same partial data group are read out in parallel to each other; and a storage write circuit, connected to said buffer read circuit and said storage, for sequentially writing said plurality of partial data groups into said storage as partial data groups of sequentially varying ones of a plurality of data groups designated by said poststore request, in such a manner that a plurality of data included in each partial data group are written into said storage in parallel to each other.

10. A data processor system according to claim 9, wherein said storage write circuit includes:

a plurality of write request circuits, each being provided in correspondence to one of said plurality of buffers, each of said write request circuits sequentially supplying a plurality of write requests required to write a plurality of data held in one of said plurality of buffers corresponding to said each write request circuit, into said storage, and a circuit connected to said plurality of write request circuits for supplying said storage with a plurality of write requests in parallel, said plurality of write requests being ones respectively supplied by said plurality of write request circuits;

wherein said each write request circuit includes:

a plurality of address generating circuits, each for sequentially generating a plurality of addresses required to write part of a plurality of data held in one of said plurality of buffers corresponding to said each write request circuit into said storage as data belonging to one data group within said plurality of data groups designated by said poststore request and a circuit for sequentially selecting a plurality of addresses generated by said plurality of address generating circuits and for sequentially supplying a plurality of write requests, each including one of said plurality of addresses as selected, wherein said selecting is executed according to a predetermined order of said plurality of address generating circuits;

wherein a plurality of addresses generated by each address generating circuit includes a plurality of addresses required to write into said storage, a plurality of data which belong to different ones of a plurality of partial data groups constituting one data group within said plurality of data groups and are held in one of said plurality of buffers corresponding to said each write request circuit.

11. A data processor system according to claim 9, further comprising:

a plurality of data storage circuits, each provided in correspondence to one of said plurality of address generating circuits within each write request circuit, each data storage circuit being selectable by at least one of said plurality of processors; and a circuit connected to said plurality of data storage circuits and said at least one processor for storing each of a plurality of poststore information as designated by said at least one processor into one of said plurality of data storage circuits as designated by said at least one processor for said each poststore information, each poststore information designating one data group to be poststored within said plurality of data groups;

wherein each address generating circuit within each write request circuit includes a circuit for sequentially generating a plurality of addresses required to write part of a plurality of data held in one of said plurality of buffers corresponding to said each write request circuit, into said storage, as a plurality of data which belong to different ones of a plurality of partial data groups constituting one data group within said plurality of data groups, wherein said one data group is one designated by poststore information stored in one of said plurality of data storage circuits provided in correspondence to said each address generating circuit.

12. A data processor system according to claim 9, wherein each buffer comprises a plurality of sequentially-ordered partial regions;

wherein said buffer write circuit includes a circuit responsive to a plurality of write requests supplied by each of said plurality of processors for sequentially writing a plurality of data supplied by said each processor into sequentially varying ones within said plurality of partial regions within one of said plurality of buffers corresponding to said each processor;

wherein said buffer read circuit includes a circuit for sequentially reading a plurality of data to be supplied from each buffer as part of a plurality of data belonging to said plurality of partial data groups to be written into said storage, from sequentially varying ones within a plurality of partial regions within said each buffer, wherein partial regions from which said plurality of data are read out are varied sequentially according to a predetermined order of partial regions.

13. A data processor system according to claim 9, wherein each buffer comprises a plurality of sequentially-ordered partial regions;

wherein said buffer write circuit includes a circuit for sequentially writing a plurality of data supplied sequentially from each processor into one of said plurality of buffers corresponding to said each processor, in such a manner that a plurality of partial regions within each buffer are divided into a plurality of partial region groups which are equal in number to a group number of data groups to be poststored as designated by said poststore request, and said plurality of data supplied by said each processor are sequentially written into sequentially varying ones of said plurality of partial region groups within said corresponding buffer;

wherein said buffer read circuit includes a circuit for sequentially reading a plurality of data from sequentially varying ones of a plurality of partial region groups within each buffer, said plurality of data being supplied from said each buffer as part of a plurality of data belonging to said plurality of partial data groups to be supplied to said storage.

14. A data processor system according to claim 9, wherein each buffer comprises a plurality of sequentially-ordered partial regions;

wherein said buffer write circuit includes a circuit responsive to a plurality of write requests supplied by each processor for sequentially writing a plurality of data supplied sequentially by said each processor into sequentially varying ones within a plurality of partial regions within one of said plurality of buffers corresponding to said each processor;

wherein said buffer read circuit includes a circuit for reading a plurality of data belonging to a plurality of partial data groups in parallel from said plurality of buffers, by reading part of said plurality of data to be supplied from said each buffer in parallel from a plurality of partial regions in said each buffer, said plurality of partial regions being successive in a predetermined order of partial regions;

wherein said storage write circuit includes a circuit for writing said plurality of data as read out from said plurality of buffers into said storage in parallel.

15. A data processor system according to claim 9, further comprising:

a circuit for detecting total numbers of a plurality of currently held but not read out data for said plurality of buffers, and for detecting whether one of said detected total numbers has reached zero, each of said total numbers of a plurality of currently held but not read out data representing a total number of a plurality of data not read out to said storage among a plurality of data currently held in said corresponding buffer; and a circuit, connected to said circuit for detecting, for prohibiting said buffer read circuit from reading a plurality data belonging a partial data group from said plurality of buffers, in response to detection by said circuit for detecting that one of said detected total numbers has reached zero.

16. A data processor system according to claim 15, further comprising:

a plurality of detection circuits each provided in correspondence to one of said plurality of buffers, each detection circuit detecting whether a total number of a plurality of currently held and already read out data for one of said plurality of buffers corresponding to said each detection circuit has become zero, said plurality of data currently held and already read out data including a plurality of data which are already written into said corresponding buffer from one of said processors corresponding to said corresponding buffer, are currently held therein and are already read out to said storage; and a circuit connected to said plurality of circuits for detecting for prohibiting each of said plurality of buffer read circuits from writing data supplied by one of said plurality of processors corresponding to one of said plurality of buffers corresponding to said, each buffer read circuit, in response to detection by one of said plurality of detection circuits corresponding to said corresponding buffer that a total number of a plurality of currently held and already read out data has become zero.

17. A data processor system, comprising:

a storage for holding data;

a plurality of processors;

a plurality of buffers interposed between said main storage and said plurality of processors, each buffer being provided in correspondence to one of said plurality of processors;

a storage read circuit provided in common to said plurality of buffers and responsive to a preload request issued by one of said plurality of processors for reading a data group as designated by said preload request from said storage, in such a manner that said data group is divided into a plurality of partial data groups which are equal in number to said plurality of processors and a plurality of data belonging to said partial data group are read out in parallel from said storage;

a buffer write circuit connected to said storage and said plurality of buffers for writing a plurality of data included in each partial data group as read out from said storage into different ones of said plurality of buffers in parallel;

a plurality of buffer read circuits, each being provided in correspondence to and connected to one of said plurality of processors, each buffer read circuit responding to a plurality of load requests supplied by one of said plurality of processors corresponding to said each buffer read circuit for sequentially reading out a plurality of data held in one of said plurality of buffers corresponding to said corresponding processor, according to an order of writing of said plurality of data into said corresponding buffer, and for supplying said plurality of data as read out to said corresponding processor;

a circuit for detecting total numbers of a plurality of currently held and already read out data for said plurality of buffers, and for detecting whether one of said detected total numbers has reached zero, each of said total numbers of a plurality of currently held and already read out data representing a total number of a plurality of data already read out to one of said plurality of processors corresponding to one of said plurality of buffers, among a plurality of data currently held in said corresponding buffer; and a circuit, connected to said circuit for detecting, for prohibiting said storage read circuit from reading a partial data group from said storage, in response to detection by said circuit for detecting that one of said detected total numbers has reached zero;

wherein said buffer write circuit includes a circuit for writing data to be written into each buffer within a partial data group read out by said storage read circuit from said storage into a location within said each buffer which holds data already written by said buffer write circuit and already read out to one of said processors corresponding to said each buffer, said partial data group being one which have been read out from said storage by said storage read circuit without prohibition by said circuit for prohibiting.

18. A data processor system according to claim 17, further comprising:

a plurality of detection circuits, each being provided in correspondence to one of said plurality of buffers, each detection circuit detecting whether a total number of a plurality of data not yet read from one of said plurality of buffers including corresponding to said each detection circuit has become zero, said plurality of data not yet read including a plurality of data already written into said corresponding buffer but not yet read out to one of said plurality of processors corresponding to said corresponding buffer; and a circuit connected to said plurality of circuit for detecting for prohibiting one of said plurality of buffer read circuits provided in correspondence to each of said plurality of buffer from reading data from said each buffer to one of said plurality of processors corresponding to said each buffer, in response to detection by one of said plurality of detection circuits corresponding to said each buffer that a total number of a plurality of data already written into said each buffer but not yet read out has become zero.

* * * * *